United States Patent [19]

Ogata et al.

[11] 4,325,629
[45] Apr. 20, 1982

[54] IMAGE FORMING METHOD AND APPARATUS THEREFOR

[75] Inventors: Takashi Ogata; Makoto Gonmori; Kenji Matano, all of Fuji, Japan

[73] Assignee: Asahi Kasei Kogyo Kabushiki Kaisha, Osaka, Japan

[21] Appl. No.: 212,966

[22] Filed: Dec. 4, 1980

[30] Foreign Application Priority Data

Dec. 7, 1979 [JP] Japan .................. 54-158156

[51] Int. Cl.$^3$ .................. G03B 27/32; G03B 27/42
[52] U.S. Cl. .................. 355/27; 355/53
[58] Field of Search .................. 355/18, 27, 28, 30; 354/3, 202 FF; 346/107 R; 250/316.1, 317.1

[56] References Cited

U.S. PATENT DOCUMENTS

| | | | |
|---|---|---|---|
| 3,509,807 | 5/1970 | Sutton et al. | 355/27 X |
| 3,782,820 | 1/1974 | Kohn et al. | 355/27 X |
| 3,944,361 | 3/1976 | Tnoue et al. | 355/27 |
| 4,018,525 | 4/1977 | Broderick et al. | 355/27 |
| 4,227,784 | 10/1980 | Kipping | 354/202 X |

*Primary Examiner*—Donald A. Griffin
*Attorney, Agent, or Firm*—Sughrue, Mion, Zinn, Macpeak & Seas

[57] ABSTRACT

Image forming methods and apparatus for forming an image, using an image forming sheet which has on an organic substrate to heat-developable image forming layer that is normally non-photosensitive but is rendered photosensitive by preheating prior to exposure and forms therein a latent image by exposure and then provides a visible image by heat development. An image forming area of the image forming sheet is preheated and heat-developed to obtain the visible image. In order to prevent an image forming area of the image forming sheet from heat deformation by heating for the preheating or heat development, the image forming area is heated by heating means, holding the opposite side from the image forming layer corresponding to the image forming area in close contact with a flat portion of an image forming area support member in a manner to extend over the entire area of the flat portion, and after the heating, the image forming area is cooled down to a temperature below the glass transition point of the organic substrate, still holding the opposite side from the image forming layer corresponding to the image forming area in close contact with the flat portion of the image forming area support member. After the cooling, the image forming area support member is brought out of contact with the image forming area.

30 Claims, 18 Drawing Figures

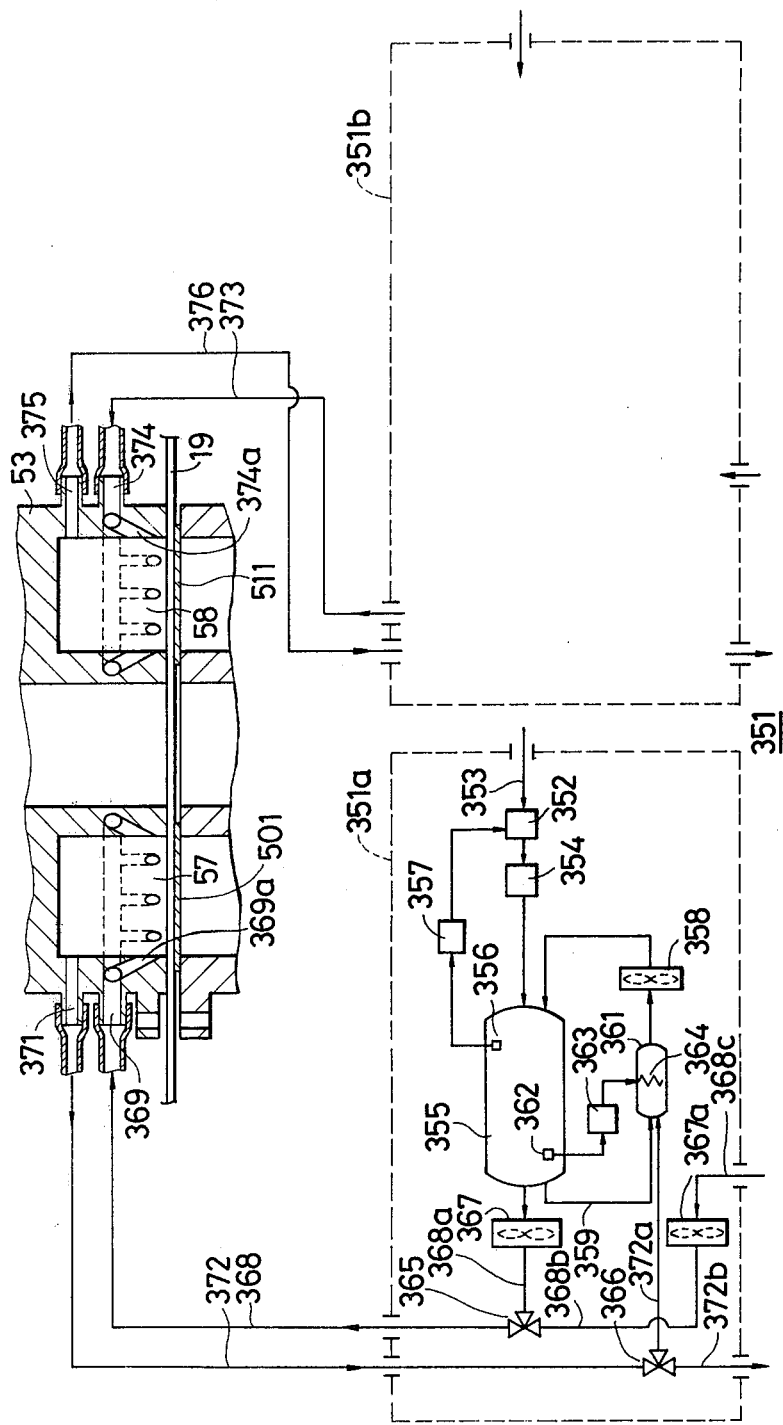

IMAGE FORMING METHOD AND APPARATUS THEREFOR

BACKGROUND OF THE INVENTION

This invention relates to image forming methods and apparatus for a heat-developable image forming sheet which is deposited over its organic substrate with a heat-developable image forming layer that is rendered photosensitive by preheating prior to exposure and forms therein a latent image by exposure and then provides a visible image by heat development.

A heat-developable image forming sheet, which is rendered by preheating prior to exposure and exposed to form therein a latent image and then heated to obtain an image (which sheet will hereinafter be referred to simply as the image forming sheet), can provide thereon a visible image only by the dry process, and the image forming sheet is non-photosensitive before it is made photosensitive by preheating. Accordingly, when only a specified area of the image forming sheet is rendered photosensitive by preheating and exposed and then heat-developed, an image is formed only in the specified area, but the other areas which are not made photosensitive at first remain non-photosensitive. Consequently, the abovesaid image forming sheet permits additional recording of an image thereon by preheating and exposing a specified section of an unrecorded area and then heat-developing it.

To render such an image forming sheet photosensitive by preheating is referred to as heat activation, and to render a latent image into a visible image by heating is called heat development.

With a conventional image recording method involving the preheating-exposure-heat development process for the image forming sheet, difficulties are encountered in obtaining an image of good quality due to heat deformation of the image forming area by heating thereof for development.

If a high-grade image can be formed on a desired area of the image forming sheet in a short time, then it is possible to enhance superiority and usefulness of the image forming sheet permitting additional image recording and to provide convenient and useful recording means.

An object of this invention is to provide image forming methods and apparatus which permit the formation of a high-grade image in a short time.

As a result of intensive researches made with a view to achieving the above object, for improvement in the image forming method for the image forming sheet, the present inventors have found out that a high-grade image can be obtained by appropriate heating and cooling methods, and have now completed this invention.

SUMMARY OF THE INVENTION

This invention is directed to image forming methods and apparatus for a heat-developable image forming sheet which is deposited over its organic substrate with a heat-developable image forming layer that is rendered photosensitive by preheating prior to exposure and forms therein a latent image by exposure and then provides a visible image by heat development. In particular, the invention is intended to prevent heat deformation of the image forming sheet resulting from its heating.

Any image forming sheet can be employed in this invention so long as it is of the type which becomes photosensitive by preheating prior to exposure and forms a latent image by exposure and then produces a visible image by heat development.

A typical example of this kind of image forming sheet is made of material which is called the dry-silver photosensitive material containing an oxidation-reduction reaction system which includes at least an organic silver salt oxidizing agent and a reducing agent for a silver ion. A more specific example of this image forming material will hereunder be described.

A specific example of the image forming sheet for use in this invention is made of a material which comprises a non-photosensitive organic silver salt oxidizing agent, a silver halide or a source of halogen ions capable of forming the silver halide by reaction with the organic silver salt oxidizing agent, a reducing agent for a silver ion, a binder, and a source of mercury ion. As another example of such a material for the image forming sheet that may be used in this invention, there is a material which comprises a non-photosensitive organic silver salt oxidizing agent, a reducing agent for a silver ion, a binder, a source of mercuric ion, carboxylic acid and/or a sensitizing dye.

The former material is disclosed, for example, in U.S. Pat. Nos. 3,802,888, 3,764,329 and 4,113,496, whereas the latter one is disclosed, for example, in U.S. Pat. No. 3,816,132 and Japanese patent application Laid Open No. 127,719/76.

As examples of the abovesaid non-photosensitive organic silver salt, there can be mentioned silver salts of long-chain fatty acids, or silver salts which are organic compounds having imino or mercapto group. The above silver salts include, for example, silver stearate, silver behenate, silver salts of benzotriazole, silver 5-nitrobenzotriazole, silver 5-nitrobenzimidazole, silver saccharin, silver phthalazinone, silver 2-mercaptobenzoimidazole, and silver 3-mercapto-4-phenyl-1,2,4-triazole. Of them, silver salts of long-chain fatty acids, such as silver stearate and silver behenate, are especially preferred. The organic silver salt oxidizing agent is used in an amount of about 0.1 to about 50 g/m$^2$, preferably 1 to 10 g/m$^2$. As the abovementioned silver halide, there are silver chloride, silver bromide, silver iodide, silver chlorobromoiodide, silver chlorobromide, silver iodobromide, silver chlorobromide and a mixture thereof.

The silver halide may be used in an amount of about 0.1 to about 40 mol %, preferably 0.5 to 20 mol %, based on the amount of the silver salt oxidizing agent.

As example of the source of halogen ions which is capable of forming a silver halide by reaction with the organic silver salt oxidizing agent, there can be mentioned a reducible halogen compound having the essential structure —CONX— or —SO$_2$NX— wherein X is chlorine, bromine or iodine, such as disclosed in U.S. Pat. No. 3,764,329. As another example of such source can be mentioned inorganic halides represented by HgX$_2$, CaX$_2$, CoX$_2$, BaX$_2$, CsX, RbX, MgX$_2$, NiX$_2$, GeX$_4$ and PbX$_2$ (X representing chlorine, bromine or iodine); organic halides having the specific element of which any one of Ga, Sn, Pb, P, As, Sb, Bi, Se and Te. Such halide, for example, may be used,

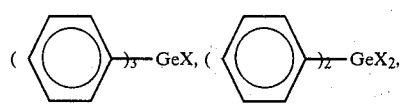

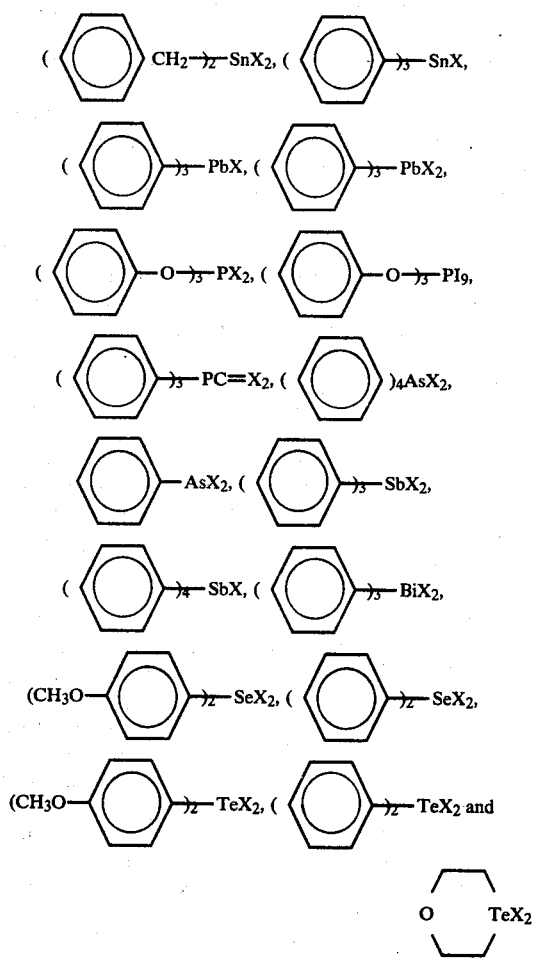

X representing chlorine, bromine or iodine); halogen molecules or species selected from bromine, iodine, iodine chloride, iodine bromide and bromine chloride; complexes of halogen molecules and specific compound such as P-dioxane; and organic halogen compound, such as triphenylmethyl bromide, triphenylmethyl chloride, iodoform, 2-bromoethanal, α-bromodiphenylmethane, α-iodophenylmethane, α-chlorodiphenylmethane, α-bromo-di-(p-methoxyphenyl)methane, etc. The amount of such a halogen ion source to be used is about 0.1 to about 40 mol %, preferably 0.5 to 20 mol %, based on the amount of the organic silver salt oxidizing agent.

A reducing agent suitable for reducing silver ions is a hindered phenol in which one or two sterically bulky groups are bonded to the carbon atom or atoms contiguous to the hydroxyl group-bonded carbon atom to sterically hinder the hydroxyl group. As example of such hindered phenols, there can be mentioned 2,6-di-tert-butyl-4-methylphenol, 2,2'-methylenebis (4-methyl-6-tertbutylphenol), 2,4,4-trimethyl-pentyl-bis-(2-hydroxy-3,5-dimethylphenyl) methane and 2,6-bis(2'-hydroxy-3'-tertbutyl-5'-methylbenzyl)-4-methylphenol. The reducing agent may be used in the amount of 0.1 to 100 wt%, preferably 1 to 100 wt%, relative to the organic silver salt oxidizing agent.

As the source of mercuric ion source, there can be mentioned mercuric acetate, mercuric behenate, mercuric benzoanate and mercuric halide.

As the organic carbonic acid, behenic acid, stearic acid and so forth are suitable. The amount of source of mercuric ion to be used is 0.1 to 7% based on the amount of the silver, which used the image forming sheet.

As the sensitizing dye, merocyanine is suitable, and examples of such dye include such as those set forth in "Organic Chemicals List", published by Nippon Kanko Shikiso Kenkyusho (Japan Photosensitive Dye Institute), pp 102–105, 1969, and pp 25–27, 1974.

As the binder, there can be mentioned polyvinyl butyral, polyvinyl formal, polymethyl methacrylate, cellulose acetate, polyvinyl acetate, cellulose acetate propionate, cellulose acetate butyrate, polystyrene and gelatin. Of them, polyvinyl butyral is especially suitable as the binder. They may be used singly or in the form of a mixture of two or more of them. It is preferred that the binder may be used in such an amount that the weight ratio of the binder to the organic silver salt oxidizing agent is in the range of from about 10/1 to about 1/10, preferably 1.2/1 to 1/2.

The material of the image forming sheet for use in this invention may further contain, as required, modifiers such as a toner for a silver image, a background-darkening preventive agent and a sensitizer in addition to the abovesaid ingredients. As the toner for a silver image, there can be mentioned, for example, phthalazinone and phthalimide. As the background-darkening preventive agent, there can be mentioned, for example, tetrabromobutane, hexabromocyclohexane and tribromoquinalidine.

The abovementioned composition is coated on a transparent support, such as a polyethylene film, a cellulose acetate film or a polyester film, together with the abovementioned binder and a suitable solvent. The thickness of the coating is about 1 to about 1,000 μm, preferably 3 to 20 μm. The ingredients of the composition may each be laminated in two or more layers, optionally. The sheet thus obtained is non-photosensitive under normal lighting conditions, and it can be handled in a light room. When a given area of this sheet is preheated in the dark, this area is rendered photosensitive.

The preheating temperature is usually higher than the glass transition point of the organic substrate, for example, 90° to 150° C., preferably 100° to 140° C. The lower the temperature is, the longer the preheating time becomes.

The exposure after the preheating is performed through utilization of ordinary exposure means by which a subject is irradiated by light of, for example, 2000 to 10,000 lux and transmitted or reflected light from the subject is projected through a lens system to the preheated image forming layer of the image forming sheet to expose it to a light image of the subject, as is the case with ordinary image forming apparatus.

The heating temperature for development is usually 100° to 170° C., preferably in the range of 110° to 160° C. The lower the temperature is, the longer the time for heat development becomes.

In the present invention, as mentioned previously, an image forming area of the image forming sheet is preheated and heat-developed after exposure. During at least one of the preheating and the heat development, the back of the image forming sheet on the opposite side from the image forming layer of the portion corresponding to the abovesaid image forming area is held to extend over the entire area of the flat upper surface of an image forming area support member while the image forming area is heated. After the heating, the image forming area is cooled down to a temperature below the glass transition point of the organic substrate of the image forming sheet, holding the heated image forming area to extend over the entire area of the flat upper surface of the image forming area support member. Thereafter, the image forming area support member is taken off from the image forming area.

In concrete terms, in order that the back of the image forming sheet on the opposite side from the image forming layer of the portion corresponding to the image forming area may be held to extend over the entire area of the flat upper surface of the image forming area support member, the image forming area of the image forming sheet must be held in close contact with the image forming area support member. To this end, use may preferably be made of means of the type, for example, that holds the image forming sheet by the flat solid-body means and a square-shaped frame disposed in opposing relation thereto to surround the image forming area and applies thereto pressure to urge the image forming area into close contact with the image forming area support member. In this case, it is preferred to apply pressure to the side of the image forming layer of the sheet, using a pressurized fluid; as the pressurized fluid, pressurized air may preferably be used by which the image forming area is pressed against the solid-body means to make close contact with its flat upper surface over the entire area thereof.

The image forming area, which is held in close contact with the flat solid-body means, as described above, is heated by heating means. The heating may be performed by flowing a heating fluid into the image forming area support member, applying an electric current to the image forming area support member, or using a heating hammer provided separately of the flat solid-body means. It is also possible to employ such heating means which requires hollow, flat solid-body means and supplying heated air as a heating fluid into the square-shaped frame for heating the air in the hollow of the image forming area support member. Further, use may also be made of means for indirectly heating the flat solid-body means by an infrared or far infrared ray device. Also it is possible to employ such an arrangement that introduces a pressurized high-temperature gas into the square-shaped frame to heat the image forming area of the image forming sheet and, at the same time, press it into close contact with the flat upper surface of the flat solid-body means. It is preferred to heat the image forming area by a heating member through the image forming area support member. This can be achieved by a method which employs a metal plate as the image forming area support member and contacts a heated metal block with the metal plate or blows a heated gas against the metal plate to heat therethrough the image forming area. In this case, it is preferred to adopt the method of contacting the heated metal block with the metal plate.

In this heating, the heating time of the image forming sheet decreases with an increase in the heating temperature; accordingly, a high heating temperature is practical and hence is employed. In this case, the heating temperature becomes higher than the glass transition point of the organic substrate of the image forming sheet by that and heat deformation of the sheet increases correspondingly unless the means proposed by the present invention is used. With the method or apparatus of the present invention, however, it is possible to prevent the heat deformation of the image forming sheet even if the heating temperature is, for instance, 100° or 130° C.

In the present invention, as is evident from the foregoing, the abovesaid image forming area support member is disposed on the side of the organic substrate of the image forming sheet, that is, on the opposite side from the image forming layer in opposing relation to the heating means.

For additional recording, it is necessary that only a specified area desired to form thereon an image be rendered photosensitive by preheating. In the case of heating the image forming area support member by the heating means disposed on the opposite side from the image forming layer for the above object, it is desirable to firmly press the marginal portion of a desired image forming area against the image forming area support member, for example, by a frame-shaped member so that heat by the heating means may not be conveyed to the surrounding area of the image forming sheet.

After being heated, the image forming area is cooled down to a temperature below the glass transition point of the organic substrate, for example, in the range of 60° to room temperature. This can be achieved by cooling the image forming area support member, using as cooling member a metal block or the like of good thermal conductivity in place of the heating means, or air of room temperature or a low-temperature gas, or flowing a cooling medium into the image forming area member. In this case, it is preferred to cool the image forming area through the image forming area support member by some cooling means in the following manner. One method is to blow a gas of a temperature lower than the glass transition point of the organic substrate against a metal plate serving as the image forming area. An alternative is to employ a metal block as the image forming area support member, introduce therein a high-temperature medium for heating the image forming area and then introduce a heat medium of a temperature below the glass transition point of the organic substrate for cooling the image forming area. In the present invention, the former is preferred.

In the present invention, during at least one of the preheating of the image forming area and the heat development after the exposure, the image forming area is heated and cooled while being held in close contact with the flat portion of the image forming area support member, as described previously. If the abovesaid heating-cooling step is employed in the preheating, then such a step need not be employed in the heat development. Also it is possible to employ such a heating-cooling step only in the heat development. In general, the heating temperature for development is higher than the preheating temperature and heat deformation of the image forming sheet is likely to occur as compared with the case of the preheating. Accordingly, it is desirable to use the abovementioned heating-cooling step in the heat development. It is more preferred to adopt the heating-cooling step in both of the preheating and the heat development process.

In the case where the image forming area need not be held in close contact with the flat portion of the image forming area support member to extend over the entire area of its surface during heating, the heating may be done by any means. In the case of additional recording, in order to heat only a specified image forming area desired to form an image, it is desirable to dispose a square-shaped frame on at least one, preferably either side of the image forming sheet so that heat by heating means may not be conveyed to the surrounding area of the sheet. In this case, the specified image forming area for additional recording may be heated directly by a heat fluid, a heating hammer or a heating lamp. Further, it is possible to heat the image forming area held in close contact with the aforesaid image forming area support member and then take it off from the image forming area without cooling it. Also in the case of additional recording, however, it is especially preferred to heat and cool the image forming area, holding it in close contact with the image forming area support member during both of the preheating and the heat development.

The preheating means may also be used as heat development means and the latter may also be provided separately of the former.

Generally, since the preheating condition and the heat development condition differ from each other in many cases, it is preferred to provide the heating means for the preheating and the heating means for the heat development separately of each other.

The apparatus of the present invention requires means for bringing the heating means into or out of contact with the image forming area support means, that is, means for controlling the flowing of a heating fluid into the image forming area support member or means for moving up and down a heating member relative to the image forming area support member. Further, it is necessary to employ another control means for the abovesaid control means so that after being heated the image forming area may be cooled, holding it in close contact with the image forming area support member.

The sensitivity of the image forming sheet can be increased by cooling the image forming area before or during the exposure of the area to a light image of the subject not only in the case where the image forming area is not cooled after being preheated but also in the case where it is cooled by the method recited in claim 1.

For forming an image at a predetermined position and for additional recording, it is preferred to provide transfer means for moving the image forming sheet to a predetermined position and fixing means for fixing the sheet at that position. Further, it is desirable to provide control means for controlling the operating time, temperature and so forth of the preheating means, the cooling means, the exposure means and the heat development means.

BRIEF DESCRIPTION OF THE DRAWINGS

FIG. 13 is a schematic diagram showing control systems and air passages for heating with heated air and cooling with low-temperature air;

DESCRIPTION OF THE PREFERRED EMBODIMENTS

Figure 1:
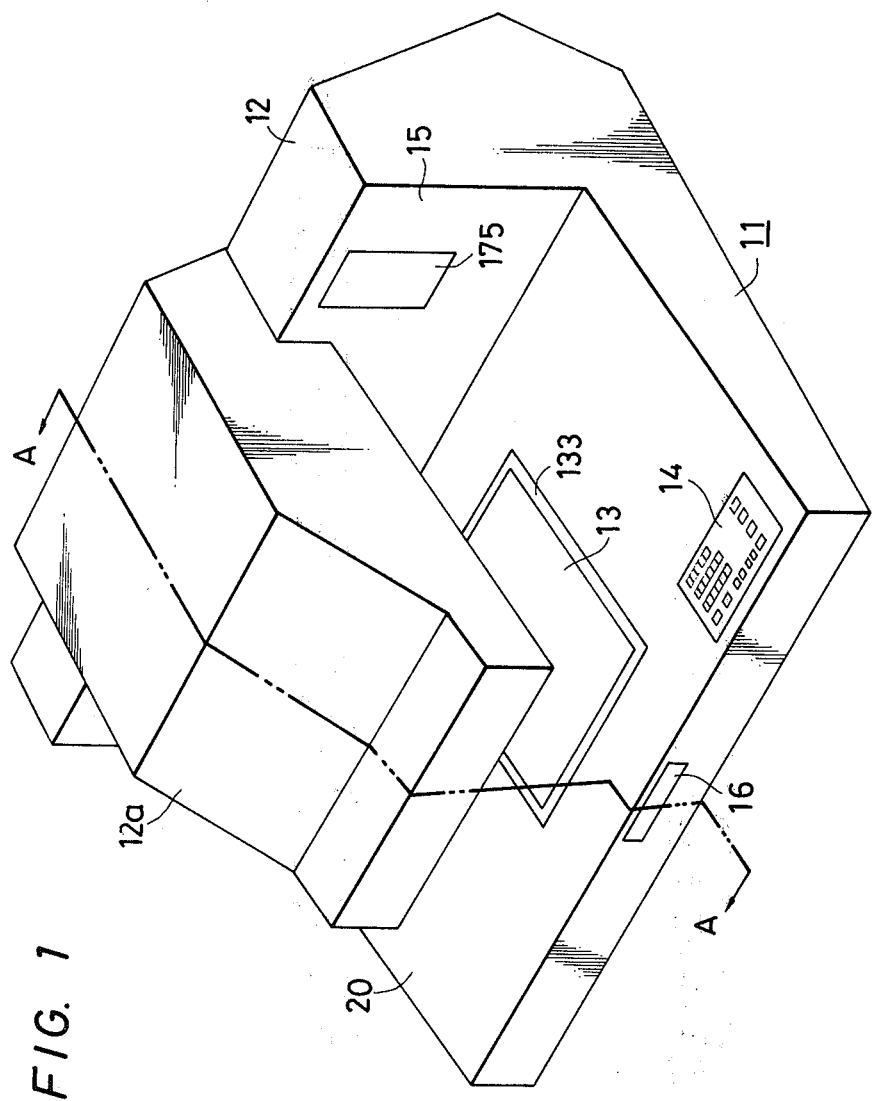
FIG. 1 is a perspective view schematically showing an external appearance of the image forming apparatus of this invention.

The image forming equipment of this invention has an external appearance such, for example, as shown in FIG. 1. A housing 12 is mounted on a base 11 at its backward portion and a subject holding part 13 is provided on the base 11 at its forward portion. An optical image introducing part 12a for introducing reflected light from the subject holding part into the housing 12 is mounted thereon to extend above the subject holding part 13. A control panel 14 is disposed on an upper panel 20 of the base 11 at a corner near its front panel, the control panel 14 having arranged thereon various control keys for controlling the image forming equipment. The front panel of the base 11 has mounted thereon a lid 16 for covering an image forming sheet insertion window. A screen 175 for projecting thereon an image is provided on a front panel 15 of the housing 12 at its one side.

Figure 2:
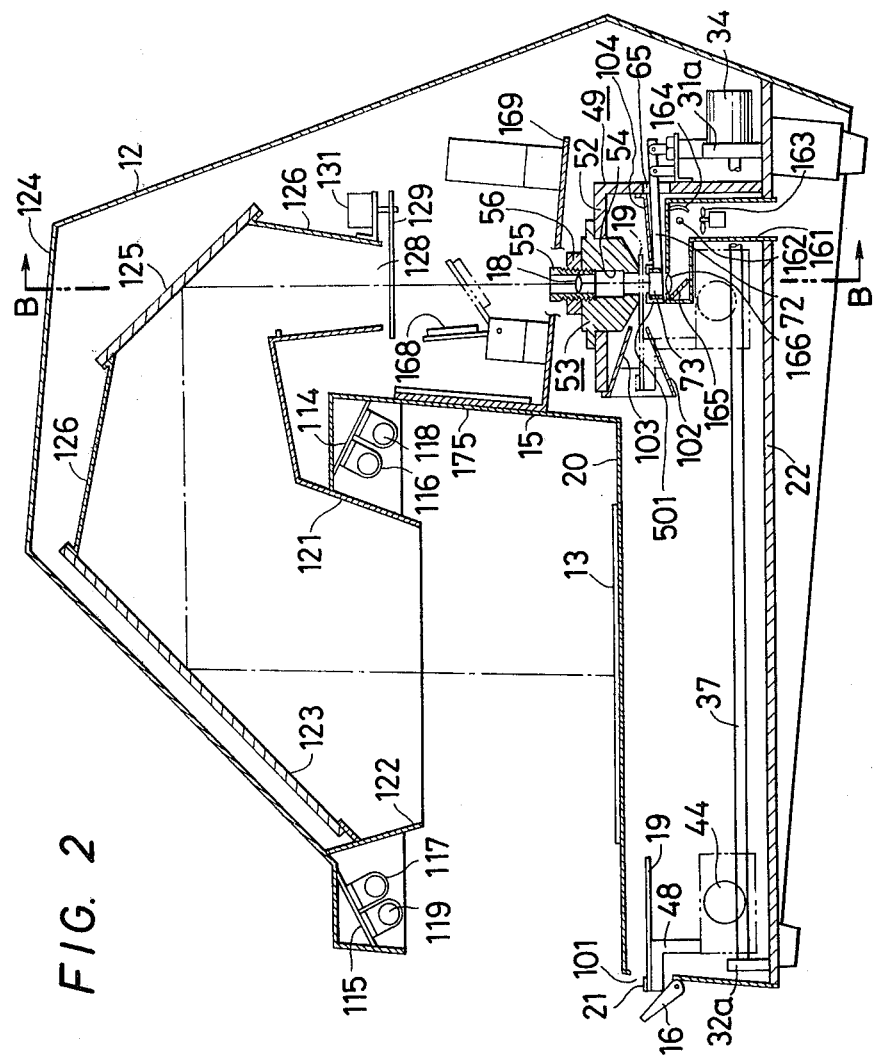
FIG. 2 is a cross-sectional view taken on the line A—A in FIG. 1.
Figure 3:
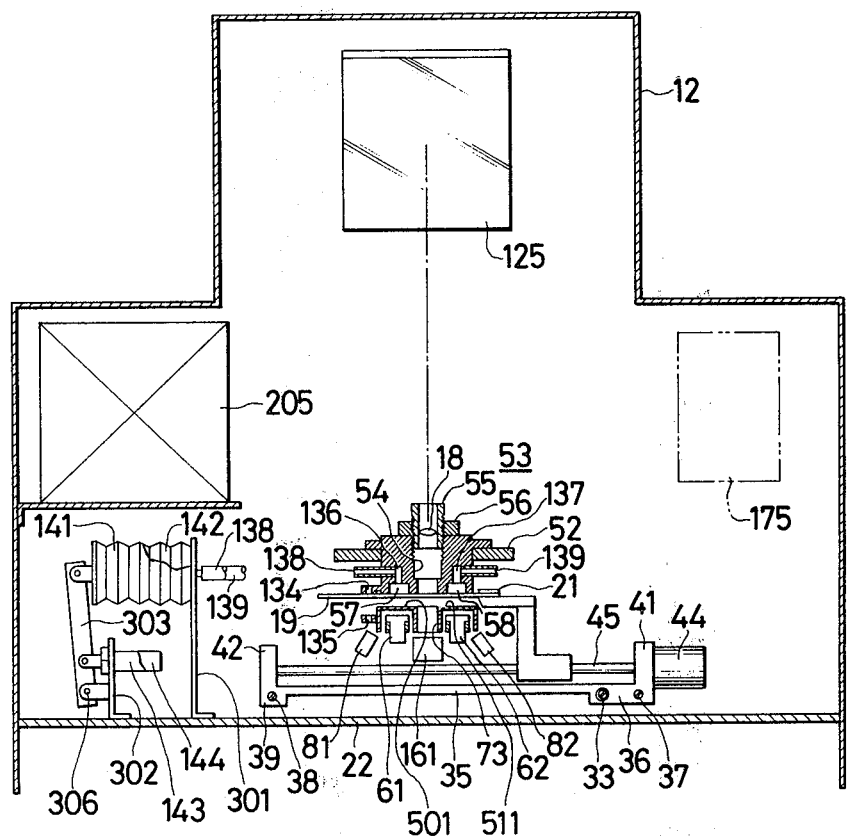
FIG. 3 is a cross-sectional view taken on the line B—B in FIG. 2.

As shown in FIGS. 2 and 3, a projecting lens 18, which forms a part of exposing means, is disposed in the housing 12 at the center thereof. An image forming sheet 19 is movably placed at a position where an image of a subject projected by the lens 18 is formed, i.e. at an image exposing position. The image forming sheet 19 is held by a holder 21, as shown in FIG. 4, and the holder 21 is supported and carried by transfer means.

Figure 4:
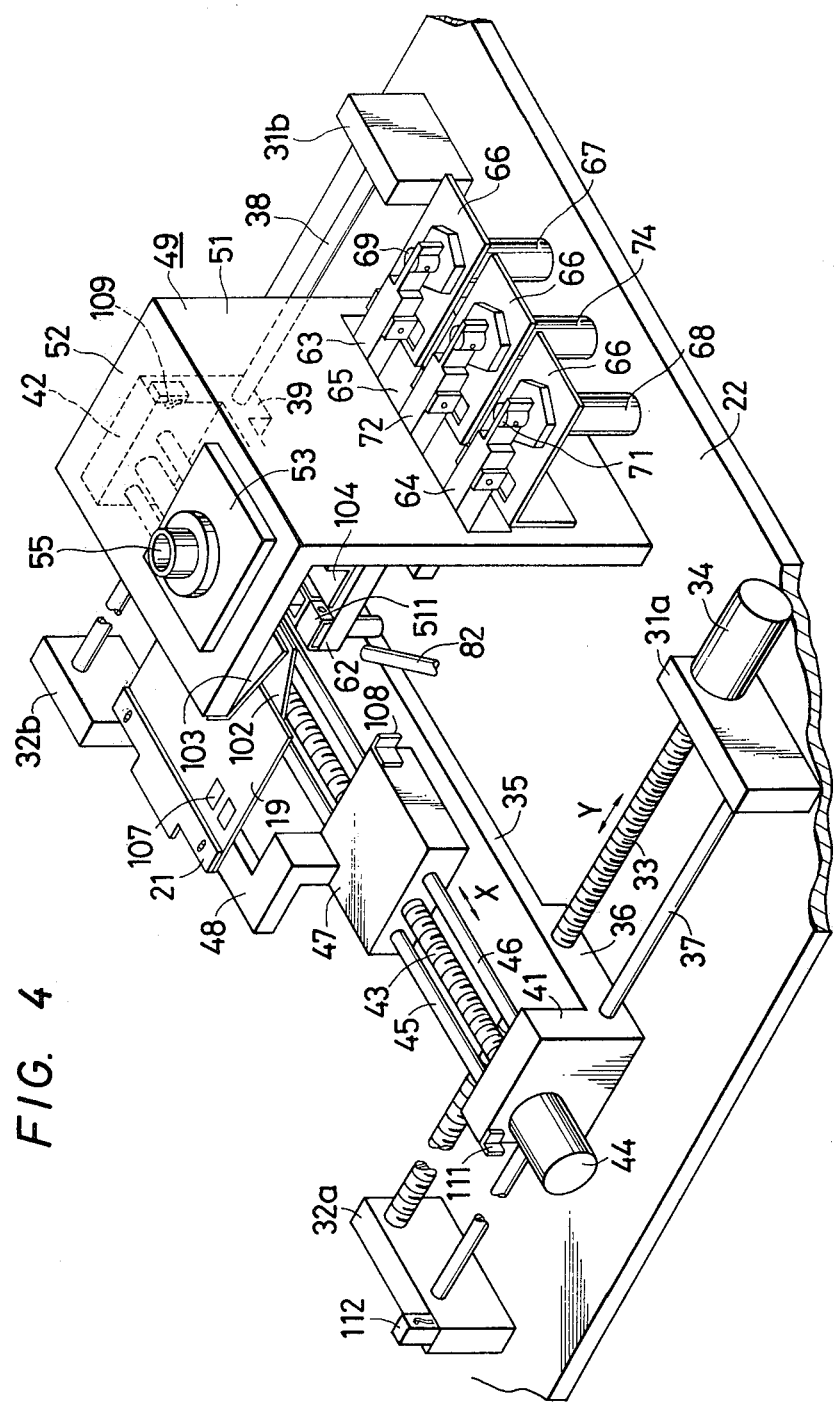
FIG. 4 is a perspective view showing the relationship between image forming sheet transfer means and a body tube members.

The transfer means is arranged, as shown in FIGS. 2 and 3 and as illustrated on an enlarged scale in FIG. 4. The upper panel 20 of the base 11 on which the subject holding part 13 is provided is slightly tilted forwardly, and a base plate 22 in the base 11 is also slightly slanted forwardly. As shown in FIG. 4, supports 31a, 31b, 32a and 32b are mounted on the base plate 22 near its four corners.

A threaded shaft 33 is rotatably installed between the supports 31a and 32a to extend in a direction perpendicular to the front panel of the base 11. One end portion of the threaded shaft 33 projects out of the support 31a, and a Y-direction motor 34 is mounted on the support 31a on the side of the projecting end portion of the threaded shaft 33. The threaded shaft 33 is driven by the Y-direction drive motor 34. The threaded shaft 33 is screwed in a tapped hole made in a support portion 36 formed at one end portion of a Y-direction moving member 35 which extends in a direction perpendicular to the direction of extension of the threaded shaft 33, so that the Y-direction moving member 35 is moved by the rotation of the threaded shaft 33 in the direction of its extension. Between the supports 31a and 32a is also bridged a guide rod 37 in adjacent and parallel relation to the threaded shaft 33, and the guide rod 37 is inserted in a through hole made in the support portion 36, by which the moving member 35 is held in a manner to be movable without rotation. Similarly, a guide rod 38 is installed between the supports 31b and 32b and inserted in a hole made in a support portion 39 formed at the other end portion of the moving member 35, permitting the moving member 35 to move in parallel to the base plate 22 in the direction of extension of the threaded shaft 33. Let this direction of movement be assumed to be a Y-axis direction, for example. A pair of support pieces 41 and 42 are fixedly secured to the both end portions of the Y-direction moving member 35 which is made movable in the Y-direction. An X-direction threaded shaft 43 is rotatably bridged between the support pieces 41 and 42. One end of the X-direction threaded shaft 43 projects out of the support piece 41, and an X-direction drive motor 44 is fixedly mounted on the support piece 41 on the side of the projecting end of the threaded shaft 43. The X-direction threaded shaft 43 is driven by the motor 44. In adjacent and parallel relation to the X-direction threaded shaft 43, guide rods 45 and 46 are bridged between the support pieces 41 and 42. An X-direction moving member 47 is provided through which the X-direction threaded shaft 43 and the guide rods 45 and 46 extend. The X-direction moving member 47 and the X-direction threaded shaft 43 are threadably engaged with each other; accordingly, rotation of the X-direction threaded shaft 43 causes the X-direction moving member 47 to move to the right and left, that is, in the X-axis direction.

Figure 6:
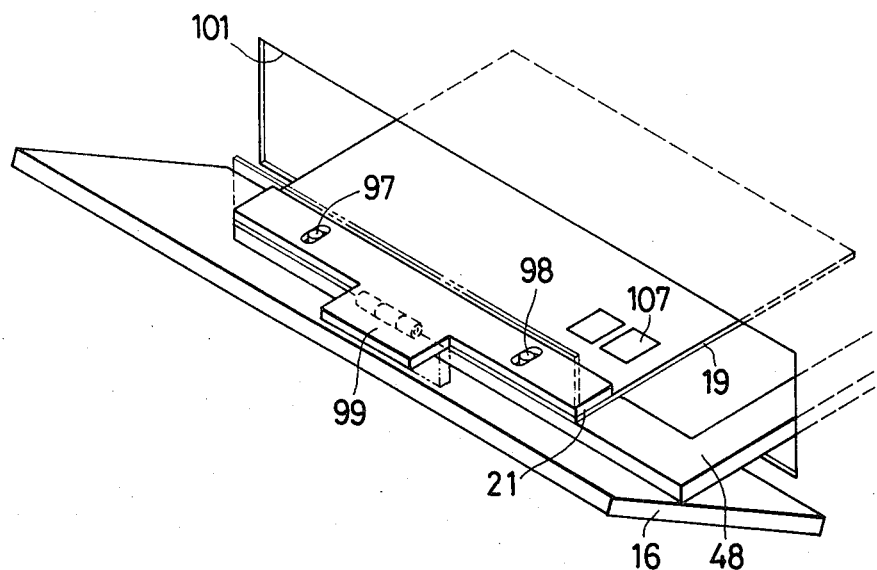
FIG. 6 is a perspective view illustrating the state in which an image forming sheet holder is positioned at an image forming sheet insertion window.

The X-direction moving member 47 has attached thereto an arm-shaped support 48, to which is pivoted the image forming sheet holder 21, as shown in FIGS. 2, 4 and 6. A pair of positioning pins 97 and 98 planted on the support 48 are inserted into apertures formed in one marginal portion of the image forming sheet 19, and the marginal portion of the sheet 19 is pressed by the holder 21 against the support 48. In this case, a coiled spring is mounted about the pivot of the holder 21 though not shown, and by this spring the holder 21 is urged against the support 48 with the image forming sheet 19 gripped therebetween. The holder 21 has made therein holes for receiving the positioning pins 97 and 98. To facilitate mounting and dismounting of the image forming sheet 19, an intermediate portion of the outer marginal portion of the holder 21 is formed to project outwardly, providing an operating piece 99. By pressing the operating piece 99, the holder 21 can easily be turned against the biasing force of the abovesaid coiled spring.

The lid 16 is also adapted to be automatically closed by a spring. When the image forming sheet 19 is mounted on the support 48 or dismounted therefrom, the holder 21 is brought forward, by the Y-direction motor 34, to its outermost position, where the support 48 pushes the lid 16 forwardly through an opening 101 (FIG. 6) formed in the front panel of the base 11; namely, the lid 16 is turned to open against the biasing force of the spring (not shown) so that the holder 21 comes out from the opening 101. This position is a reference position of the holder 21, where the image forming sheet 19 can be mounted on or dismounted from the support 48. When the support 48 is brought back into the base 11, the lid 16 is automatically turned to cover the opening 101. Thus, unnecessary light can automatically be shut out of the equipment.

It is preferred to provide a guide by which the image forming sheet 19 held by the holder 21 is brought to an exposing or heating position. The guide comprises, for example, upper and lower guide plates 103 and 102 attached to a photographing unit support 49, as depicted in FIGS. 2 and 4. The distance between the upper and lower guide plates 103 and 102 is gradually reduced as a body tube member 53 supporting the projecting lens 18 is approached, and the image forming sheet 19 is guided to the exposing or heating position under the body tube member 53 passing between the guide plates 103 and 102.

Further, a guide plate 104 for guiding the image forming sheet 19 having moved past the body tube member 53 is attached to a vertical wall 51 of the photographing unit support 49 to extend backwards from the vicinity of the body tube member 53 under the image forming sheet 19, that is, on the side of the base plate 22. It is preferred that these guide plates 102 to 104 are made of resilient thin sheet of a synthetic resin or phosphor bronze. The guide plates need not always be made flat but may also be curved. With the provision of such guide, the image forming sheet 19 pressed by the holder 21 at one side only can surely be brought to a photographing position without being bent. The guide is not limited specifically to the abovesaid but may also be other types. For example, in the case of the image forming sheet 19 being bent, it is possible to guide the sheet 19 by revolving belts or rollers to the photographing position while straightening the bend of the sheet 19.

The image forming sheet 19 has a plurality of image forming areas or so-called frames 107 arranged in a matrix form, as shown in FIG. 4. The image forming sheet 19 is mounted on the support 48 in such a manner that any desired one of the frames 107 can be brought exactly to the exposing or heating position. The support 48 is halted at the aforementioned reference position, where the holder 21 assumes its outermost position. To perform this, for example, as shown in FIG. 4, a projecting piece 108 is secured to the X-direction moving member 47 so that immediately before the X-direction moving member 47 reaches the support 42, the projecting piece 108 moves into contact with a microswitch 109 attached to the support 42 to stop there the X-direction movement. Likewise, a projecting piece 111 is secured to the support 41 of the Y-direction moving member 35, and immediately before the moving member 35 reaches the support 32, the projecting piece 111 moves into contact with a microswitch 112, halting there the Y-direction movement. In this manner, by driving the micro-switches 109 and 112, the support 48 is stopped at the reference position, that is, at its outermost position. As the motors 44 and 34, use is made of drive motors capable of controlling the amount of movement with high accuracy, for example, step motors, and by the numbers of pulses applied to the motors, the amount of movement of the image forming sheet 19 from the aforesaid reference position in the X- and Y-axis direction can be determined and an accurate position of the image forming sheet 19 can be detected. In the manner described above, a desired one of the frames of the image forming areas 107 on the image forming sheet 19 is brought to the heating or exposing position.

The image forming sheet 19 may take the form of not only a microfilm that a plurality of frames are arranged in matrix form on a sheet of film but also a roll film having arranged thereon many frames in side-by-side relation or a cut film having formed thereon only one frame. The microfilm-type image forming sheet 19 may be held by the holder at two or more sides as well as at one side; however, from the standpoint of contacting the image forming sheet 19 with the end face of a heater over its entire area and pressing the sheet 19 against the body tube member 53, it is preferred that the sheet 19 is held at one side.

Before describing means for holding the image forming area in close contact with an image forming area support member over its entire area on the opposite side from the image forming layer of the sheet, reference is made to FIGS. 2 to 4 for illustrating an example of each of heating means, and exposure means which form the principal part of the equipment of this invention, and for describing the construction of each of them at each of the heating, and exposing positions in the illustrated embodiment. In this embodiment, the heating means comprises preheating means and heat-developing means provided separately, and these two means are described to be in the form of high-temperature solid bodies, for example, metal blocks. As shown in FIGS. 3 and 4, the inverted L-shaped photographing unit support 49 is fixedly mounted on the base plate 22 at is backward portion. The vertical wall 51 of the support 49 extends upwardly of the base plate 22 at substantially right angles thereto, and an upper horizontal plate member 52 of the support 22 extends towards the front panel 15 in substantially parallel relation to the base plate 22. The upper plate member 52 has made therein a hole 55, in which the body tube member 53 is snugly fitted and fixed.

The body tube member 53 is formed, for example, with a metal block, in which a through hole 54 is formed to extend in a direction vertical to the base plate 22, and the lens 18 is disposed in the through hole 54. In the body tube member 53 there are formed on the left and right of the through hole 54 recesses 57 and 58 which open to the base plate 22, and the recesses 57 and 58 each have a size corresponding to each image forming area or frame 107 of the image forming sheet 19. The peripheral margin of each recess, on all sides, is made frame-shaped to form a part of means for fixing the image forming sheet 19 during heating.

Figure 5:
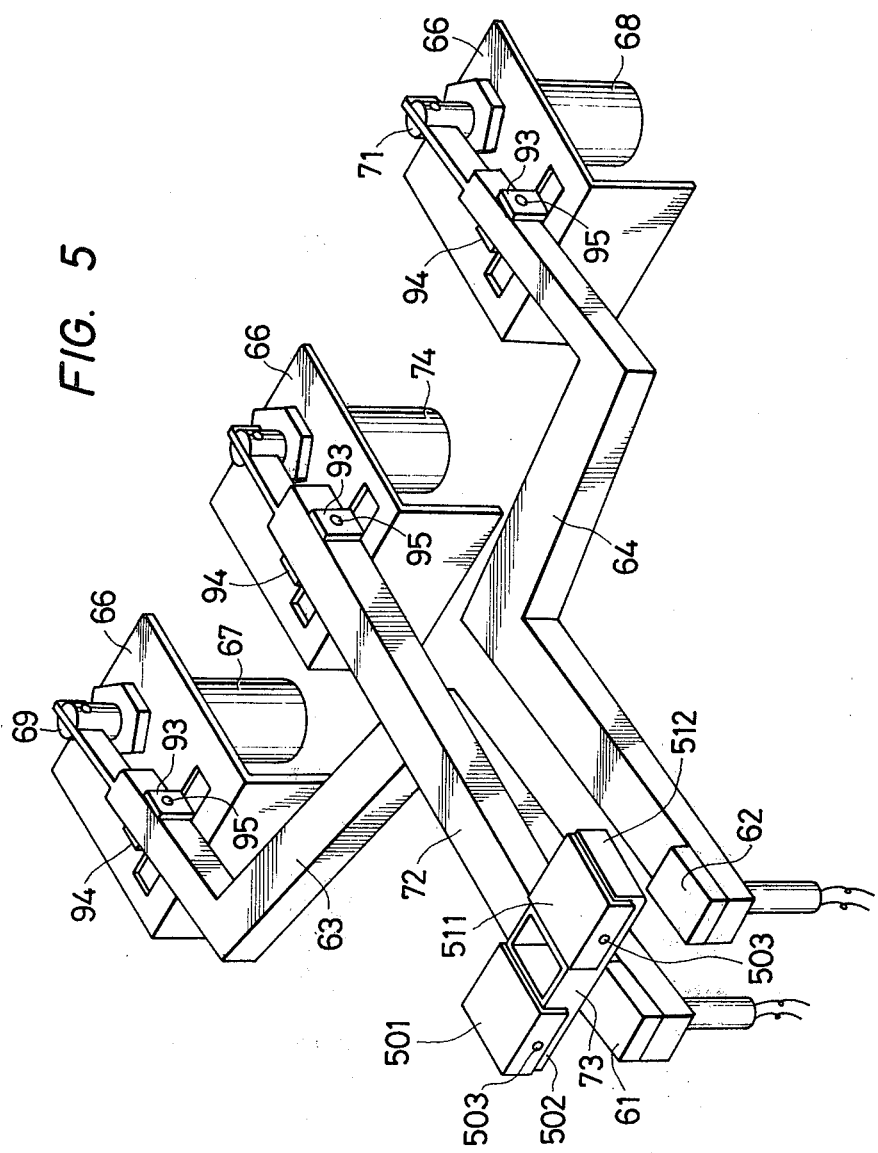
FIG. 5 is a perspective view showing, by way of example, a drive mechanism for a frame-shaped member of a heater.

In opposing relation to the recesses 57 and 58 there are disposed a first heater 61 for preheating use, and a second heater 62 for heat-developing use. The heaters 61 and 62 are respectively carried at one end of rotary levers 63 and 64 which extend in direction perpendicular to the vertical wall 51 of the photographing unit support 49, as shown in FIGS. 4 and 5. The rotary levers 63 and 64 project out backwardly through an opening 65 made in the vertical wall 51 of the photographing unit support 49. The rotary levers 63 and 64 are each pivotally mounted at the intermediate portion on a pin 95 bridged between a pair of lugs 93 and 94 cut to rise up from a bracket 66 secured to the back of the vertical wall 51. The rear end portions of the rotary levers 63 and 64 and pivotally coupled with plungers 69 and 71 of solenoids 67 and 68 mounted on the brackets 66 respectively. By controlling the solenoids 67 and 68, the rotary levers 63 and 64 are respectively turned to bring the heaters 61 and 62 to positions for heating the image forming sheet 19 through image forming area support members 501 and 511 described later.

As shown in FIGS. 2 and 3, the through hole 54 of the body tube member 53 is threaded, and a body tube 55 having screw threads formed on its outer peripheral surface and carrying the lens 18 is screwed into the through hole 54. By turning the body tube 55, the position of the lens 18 is adjusted relative to the image forming sheet 19 placed in contact with the end face of the body tube member 53, by which it is possible to perform fine control of the position where the image of a subject is formed. The position of the body tube 55, and accordingly the position of the lens 18 is fixed by tightening a nut 56 threadably engaged with the body tube 55. The size of the open end of the through hole 54 on the side of the image forming sheet 19 corresponds to the area of one frame of the image forming sheet 19, and the peripheral margin defining the open end is also used as a frame forming a part of the means for fixing the image forming sheet 19 during exposure.

As shown in FIG. 5, a rotary lever 72 is interposed between the rotary levers 63 and 64 in parallel relation thereto so as to ensure that during exposure the image forming sheet 19 is retained accurately at the position where the image of a subject is formed. The rotary lever 72 carries at one end a second hollow, frame-like member 73 for exposure use and is pivoted at the other end to a solenoid 74 mounted on a bracket 66, and further, the lever 72 is pivotally mounted, at its intermediate position, on a pin 95 bridged between a pair of lugs 93 and 94 cut to rise up from the bracket 66. By controlling the solenoid 74, the rotary lever 72 is turned, by which the image forming sheet 19 is urged by the second frame-shaped member 73 for exposure use against the frame-like peripheral margin of the through hole 54 of the body tube member 53 serving as the other frame-like member; consequently, the image forming sheet 19 is gripped between the both frame-like members and hence fixed in position. In this case, the second frame-shaped member 73 is made a little larger than the through hole 54 to assume that the image forming sheet 19 is pressed against the body tube member 53. The hollow, frame-shaped member 73 need not always be frame-shaped but may also be plate-shaped, but it is preferred to be hollow, frame-shaped in order to form, therein a path of light from a light source 162 for reading by a reader described later.

FIG. 3 illustrates a preferred arrangement in which recess 57, the through hole 54 and the recess 58 are equal in the center-to-center distance to the successive image forming areas or frames of the image forming sheet 19 and are disposed in alignment, and in which the preheating means, exposure means and the heat-developing means are positioned respectively correspondingly to the successive image forming areas.

Referring now to FIGS. 2 to 5 and 7, a description will be given of an example of an arrangement for holding the image forming area of the image forming sheet in close contact with the flat portion of the aforementioned image forming area support member over its entire area on the opposite side from the image forming layer of the sheet.

On both sides of the second frame-like member 73 carried by the rotary lever 72, frame members 502 and 512 are provided integrally with the second frame-like member 73 in opposing relation to the heaters 61 and 62, respectively. The frame members 502 and 512 have an outer size a little larger than one frame of the image forming sheet 19 and an inner size large enough to receive the heaters 61 and 62, respectively. On the upper open ends of the frame members 502 and 512 on the opposite side from the heaters 61 and 62 are respectively mounted flat plates 501 and 511 of stainless steel by means of screws 503; namely, the frame members 502 and 512 and the flat plates 501 and 511 form flat image forming area support members. The flat plates may be formed of a metal of good thermal conductivity other than the stainless steel. The thickness of each flat plate is 0.03 to 0.5 mm, preferably 0.05 to 0.3 mm.

With the rotational movement of the rotary lever 72, two frames of the image forming sheet 19 are individually held fixedly by the frame-like member of the recess 57 and the flat plate 501, and the frame-like member of the recess 58 and the flat plate 511.

The flat image forming area support member forming one part of the means for holding the image forming sheet is shown to be a unitary structure of the flat plates 501 and 511 and the frame members 502 and 512 but need not always be limited specifically thereto. For example, it is possible to omit one of the flat plates 501 and 511. Further, the two pairs of flat plates 501 and 511 and frame members 502 and 512 are shown to be provided on the both sides of the second frame-like member 73 integrally therewith, but it is also possible to mount them on independent rotary levers and operate them independently.

In order that the back of that portion of the image forming sheet corresponding to the image forming area which is held by the flat plates 501 and 511 and the frame-like members of the recesses 57 and 58, as described above, may be closely contacted with the flat plates 501 and 511 to extend over their entire area, there are provided in the frame-like members 57 and 58, for example, gas inlet ports 136 and 137, that is, pressurizing means for applying a fluid pressure to the image forming sheet on the opposite side from the flat plates 501 and 511.

The pressurization using fluid pressure is performed after or at the same time as the image forming sheet is fixed in position by the fixing means, preferably while the abovesaid image forming area support members are in contact with the image forming sheet. As a fluid for this purpose, a gas is suitable; in particular, pressurized air is preferred. By uniformly pressurizing at least one image forming area of the image forming sheet with the fluid towards the image forming area support member, the entire image forming area is closely contacted with the image forming area support member under a uniform contact pressure while being heated by the heating solid body, so that the image forming area is heated uniformly. As a consequence, uniform preheating makes the image forming area photosensitive all over it, uniform heat-development provides a sensitivity rise without dispersion, thus ensuring image formation of excellent reproducibility. Further, it is possible to avoid heat deformation of the image forming area which is caused by pressurization and heating of the image forming sheet by the heaters during heating. It is desirable that the pressure applied to the image forming sheet by pressurization with fluid is in the range of 100 to 1000 mmH$_2$O.

Figure 7:
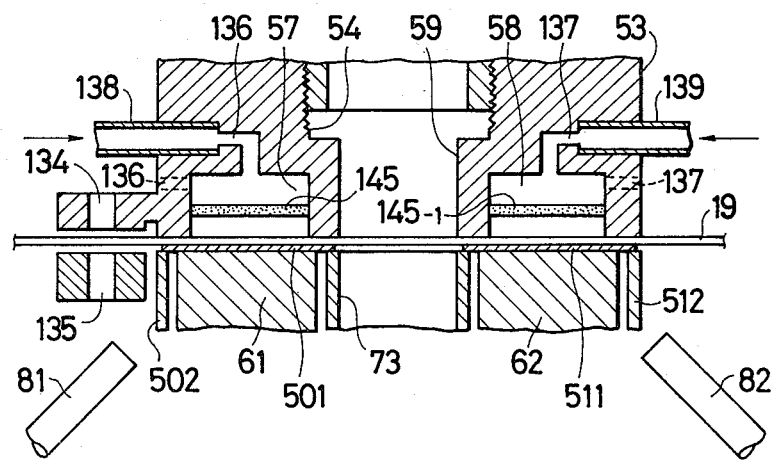
FIG. 7 is a cross-sectional view illustrating example of the body tube portion.

As a preferred example of the pressurizing means, gas inlet ports 136 and 137 are respectively formed in the body tube member 53 to extend from the bottoms of the recesses 57 and 58 to the outside, as shown in FIGS. 3 and 7. The gas inlet ports 136 and 137 are respectively connected via pipes 138 and 139 to bellows 141 and 142 serving as pressurized gas sources. To the bellows 141 and 142, plungers of plunger solenoids 143 and 144 are pivotally coupled at one end, and by energization of the plunger solenoids the bellows are contracted to supply air therefrom to the recesses 57 and 58 via the pipes respectively corresponding thereto.

An arrangement for expanding and contracting the bellows 141 is such, for example, as shown in FIG. 3. The bellows 141 is fixed at one end to a mounting plate 301 secured to the base plate 22, and the solenoid 143 is also mounted to a mounting plate 302 fixed to the base plate 22. By energization of the solenoid 143, one end of a link 303 is turned about a pin 306 bridged between a pair of lugs cut to rise up from the mounting plate 302, pressing the other end of the bellows 141 towards the mounting plate 301 to contract the bellows 141. Upon de-energization of the solenoid 143, the bellows 141 is expanded by the spring force of the solenoid 143 to return to its original position. The bellows 142 are also expanded and contracted by the same arrangement as described above. As the pressurized gas source, a pressure pump is preferred other than the bellows, and in such a case, pressure can properly be applied to each of the pressure by driving the pump.

FIG. 7 is a cross-sectional view showing, on an enlarged scale, the state in which the image forming area support members 501 and 511 the heaters 61 and 62, and the second frame 73 for exposure use are urged against the body tube member 53 with the image forming sheet 19 gripped therebetween. When air pressure is applied to the recesses 57 and 58 in the state that the image forming sheet 19 is pressed against the body tube member 53 through the image forming area support members 501 and 511 by the heaters 61 and 62, those areas of the image forming sheet 19 underlying the recesses 57 and 58 are urged uniformly against the heaters 61 and 62 accordingly, the image forming sheet 19 is heated uniformly all over these areas. The sizes of the recesses 57 and 58 are selected larger than the size of one frame including its margin, so that the marginal portions of the recesses 57 and 58 do not touch the image forming area, that is, the marginal portion of each recess lies on the outside of a projected image of the highly reflective frame 133 for double image formation preventive use.

In the example of FIG. 7, pressure distributing plates 145 and 145b are respectively disposed in the recesses 57 and 58 at their intermediate portion in opposing relation to the image forming sheet 19. These plates may be made of a sintered metal, for example, of brass or stainless steel, or sponge or like porous material, or they may also be plates, each having perforations distributed substantially uniformly over the entire area. In short, air pressure supplied from the inlets 136 and 137 is distributed by the plates 145 and 145b to be applied uniformly to the image forming sheet 19.

But the abovesaid distributing plates can be dispensed with by a modification of the positions of the pressurized gas inlet ports, that is, forming the pressurized gas inlet ports 136, and 137 in the side walls of the recesses 57 and 58, as indicated by the broken lines in FIG. 7, or spacing the gas inlet ports as far apart from the image forming sheet 19 as possible.

Next, a description will be given of means for cooling the organic substrate of the image forming sheet after heating it by the heating means.

For example, as shown in FIG. 7, nozzles 81 and 82 for cooling thin plates are provided adjacent the flat plates 501 and 511 on the side of the substrate 22. The cooling by the nozzles 81 and 82 are performed when the heaters 61 and 62 are brought down by the rotary levers to their non-heating positions. By the nozzles 81 and 82, for example, cooled air is blown against the flat plates 501 and 511 to cool therethrough the image forming sheet 19.

In this case, the flat plates 501 and 511 may be permitted to stand until their temperature goes down naturally after the heaters 61 and 62 are brought out of contact with the flat plates 501 and 511 by the rotary levers 63 and 64. For rapidly cooling the flat plates 501 and 511, however, it is preferred to blow the cooled air against them from the nozzles 81 and 82. For this cooling, use may be made of the various methods described previously in the beginning of the specification, other than the abovesaid method of blowing a cooled gas against the image forming sheet.

Further, such cooling methods may also be employed for cooling the image forming sheet during the exposure.

The temperature for further cooling the preheated and cooled image forming area prior to or during the exposure is 60° C. or lower, preferably 40° C. or lower.

Figure 9:
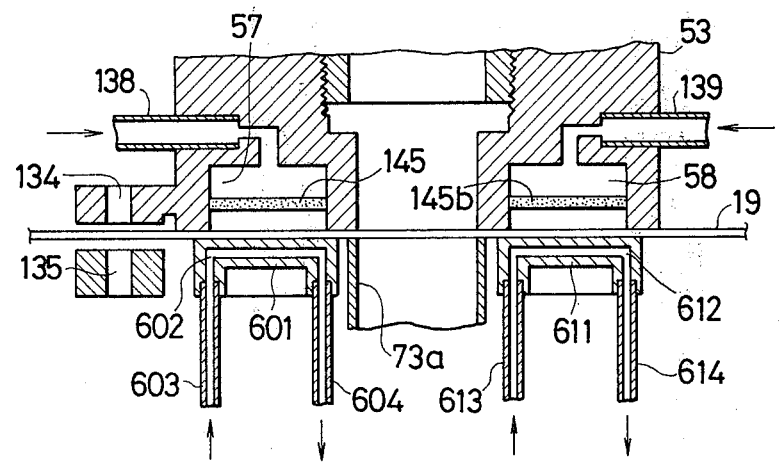
FIG. 9 is a cross-sectional view showing other modified form of the body tube member and a heater.

In the above, the image forming area support members are formed by the flat plates 501 and 511 but may also be formed by heat treatment members 601 and 611 such, for example, as shown in FIG. 9. The heat treatment members 601 and 611 respectively have flat surfaces confronting the body tube member 43 and have formed therein spaces 602 and 612 which extend along the flat surfaces in adjacent relation thereto. And fluid inlet pipes 603 and 613 and fluid outlet pipes 604 and 614 are respectively coupled with the heat treatment members 601 and 611 in such a manner that they communicate with both open ends of the spaces 602 and 612, respectively. In this case, in the state in which the image forming sheet is held by the heat treatment members 601 and 611 and the frame-like members of the recesses 57 and 58 and closely contacted with the flat surfaces of the heat treatment members 601 and 611 by introducing a pressurized gas into the recesses 57 and 58, a heating fluid is flowed in and out of the spaces 602 and 612 through the fluid inlet pipes 603 and 613 and the fluid outlet pipes 604 and 614 to heat the image forming sheet and thereafter a cooling fluid is similarly flowed in and out of the spaces 602 and 612 to cool the image forming sheet.

In general, when the image forming sheet has a plurality of frames, they are arranged in alignment, and accordingly it is desirable that at least the first heating means, the exposure means and the second heating means are also disposed in alignment, for example, in such a manner that they confront adjacent image forming areas.

The first heating means, the exposure means and the second heating means are usually provided in adjacent relation, but other means may also be interposed between them, as required.

The image forming area of the image forming sheet, after being activated by the first heating means to be rendered photosensitive, is shifted by one frame to an exposure position, where an image of a subject disposed on the subject holding part 13 is projected onto that frame of the image forming sheet 19 brought to the exposure position. To this end, a lamp support plate 114 is attached to the underside of the inner end portion of the optical image introducing part 12a obliquely above the subject holding part 13, as shown in FIG. 2. The lamp support plates 114 and 115 have mounted thereon lamp sockets 116 and 117 side by side for receiving long fluorescent lamps 118 and 119. The support plates 114 and 115 are arranged so that lights from the fluorescent lamps 118 and 119 are directed to the subject holding part 13.

Reflected light of the subject placed on the subject holding part 13 moves towards the optical image introducing part 12a in a direction substantially perpendicular to the base 11. A light receiving window 121 is formed in the optical image introducing part 12a to open to the subject holding part 13. A hood 122 is attached to the window 121 to extend therefrom downwardly for shielding from unnecessary external light. Having entered in the optical image introducing part 12a, the reflected light from the subject strikes against a reflector 123 installed in the optical image introducing part 12a at an angle of substantially 45° to the base plate 11, and the reflected light is reflected by this reflector 123 at substantially right angles to move on backwards substantially in parallel with the base 11, thus entering into the housing 12. Above the body tube member 53, that is, on the side of a top panel 124 of the housing 12, a reflector 125 is disposed, and the light reflected from the reflector 123 is reflected by the reflector 125 to pass towards the projecting lens 18 of the body tube member 53 along its optical axis.

Also in the optical image introducing part 12a and the housing 12, there is provided a tubular light shielding box 126 which extends from the inner edge of the hood 122 surrounding the optical paths between the reflectors 123 and 125 and between the reflector 125 to a shutter 129.

In this manner, the image of the subject on the subject holding part 13 is reflected by the reflectors 123 and 125 and then projected by the lens 18 onto the image forming sheet 19. In order to determine the time for exposing the image forming sheet 19 to the image of the subject, there is provided on the light shielding box 126 on the side of the reflector 125 the shutter 129 for opening and closing the optical path 128 on the side of the projecting lens 18. The shutter 129 is driven, for example, by a solenoid 131 to open and close. The shutter 129 is opened by known automatic exposure detecting means (though not shown) for a right exposure time. Needless to say, the photosensitive material layer of the image forming sheet 19 confronts the through hole 54 of the body tube member 53.

A variety of tactics are considered for preventing the likelihood of accidental re-recording on an already recorded frame, that is, double image formation. One of effective methods for use with the equipment of this invention is to dispose a strip of a reflective material on at least one side, preferably on all sides of the subject holding part 13 substantially corresponding to one image forming area of the sheet 19 and to photograph the strip along with the subject. For example, as shown in FIG. 1, a highly reflective frame 133 of high reflection factor is formed on the marginal portion of the subject holding part 13 on all sides. That is, the subject holding part 13 is formed with a substrate of a color of low reflection factor, for example, black, and is surrounded with a square frame 133 made of a white material, aluminum foil or like high-reflection-factor material and whose inside dimension is equal to the outside one of the subject holding part 13 corresponding to one frame. A subject is placed within the highly reflective frame 133 and positioned relative to the frame 133, and a record of density depending on the reflection factor of the highly reflective frame 133 is always provided on the inner marginal portion of the image forming area of the image forming sheet 19 corresponding to the marginal portion of the subject. The highly reflective frame 133 may also be made to be projecting from on one or all sides.

In order to detect the already recorded frame, there is disposed a double image formation preventive detector for checking whether or not the margin of the subject is photographed on the frame subject to the check, at a position spaced a distance of one frame of the image forming sheet 19 from the recess 57 of the body tube member 53 on the opposite side from the through hole 54. This double image formation preventive detector is composed of, for example, a photo diode or like light emitting device 134 and a photo transistor or like photo detector 135 which are provided with the image forming sheet 19 interposed therebetween.

The light emitting device 134 is mounted on an extension of the body tube member 53, whereas the photo detector 135 is supported so that it can be advanced and retracted relative to the image forming sheet 19 in the same manner as the heater 61, though not illustrated. Where the quantity of light received by the photo detector 135 is less than a predetermined value, it is decided that the frame is an already recorded one.

Figure 11:
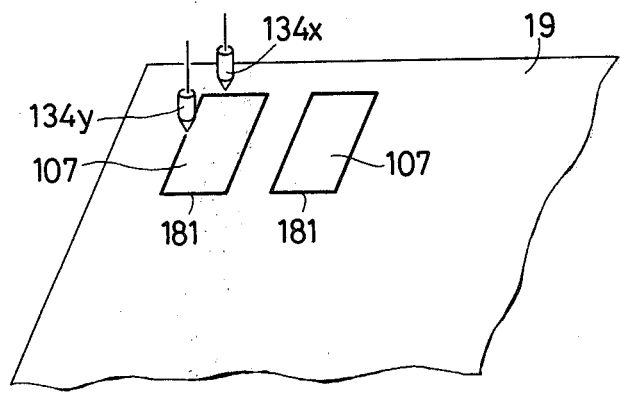
FIG. 11 is a diagram showing the relationship between frames of the image forming sheet and double exposure checking elements.

Next, the double image formation preventive means will be described in more detail. For example, as shown in FIG. 11, in the case of an already recorded frame, there is formed around the frame 107 on the image forming sheet 19 a record frame 181 of high density corresponding to the highly reflective frame 133 of the subject holding part 13 described previously in respect of FIG. 1. Light emitting devices 134$x$ and 134$y$ are disposed opposite the X- and Y-direction parts of the record frame 181 respectively, and photo detectors 135$x$ and 135$y$ are arranged in opposing relation to the light emitting devices 134$x$ and 134$y$ respectively although they are in the shadow of the image forming sheet 19 in FIG. 11.

Figure 12:
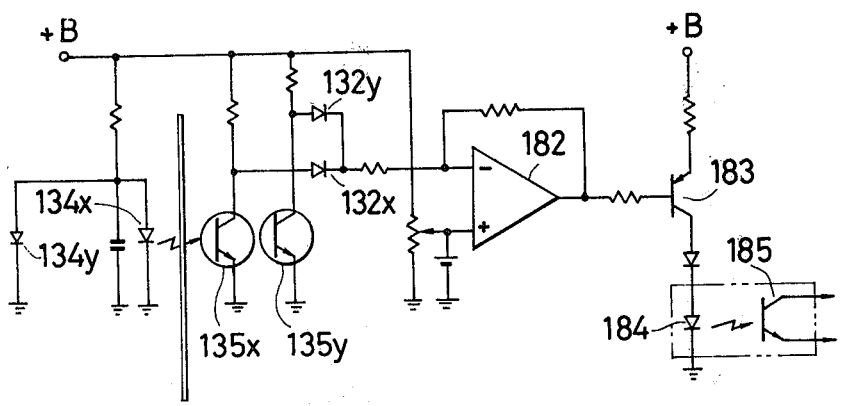
FIG. 12 is a circuit diagram illustrating an example of a double image formation preventive means.

The light emitting devices 134$x$ and 134$y$ are disposed opposite to the photo detectors 135$x$ and 135$y$ respectively corresponding thereto, with the image forming sheet 19 interposed therebetween, as shown in FIG. 12. In this example, the photo detectors 135$x$ and 135$y$ are photo transistors, whose collectors are respectively connected to one input terminal of a comparator 182 via diodes 132$x$ and 132$y$ forming an OR circuit, the other input terminal of the comparator 182 being supplied with a reference voltage.

When either one of the photo detectors 135$x$ and 135$y$ happens to confront the record frame 181, the photo detector output supplied to the comparator 182 increases higher than the reference voltage, and the comparator 182 provides a low-level output. The low-level output is applied to a PNP transistor 183 to conduct it, and a light emitting diode 184 is lighted, with the result that a photo detector 185 combined with the diode 184 to constitute a photo coupler is given information indicating that the frame is an already recorded one.

In the case where a pair of photo detector and light emitting device for detecting the record frame is provided for each of the X- and Y-directions of the record frame 181 as described above, even if the pairs of photo detectors and light emitting devices are a little out of position relative to the image forming sheet 19, at least one of the pairs confronts the record frame 181, ensuring the detection of the record frame.

In the above, use is made of transmitted light through the record frame 181 photographed on the image forming sheet 19 for preventing the double image formation, but it is also possible to employ reflected light from the record frame 181. Also it is possible to use transmitted light through or reflected light from an image photographed in the frame without providing and photographing the highly reflective frame 133. This double image formation preventing means is preferred to be disposed in alignment with the first heating means, the exposure means and the second heating means; in particular, it is preferred that the double image formation preventing means, the first heating means, the cooling means, the exposure means and the second heating means are arranged in alignment.

When the image forming sheet 19 has been moved in the X-axis direction to bring the frame to be recorded to the position of the double image formation preventing means, as shown in FIG. 3, it is checked by the light emitting device 134 and the photo detector 135 whether the frame is an already recorded one or not. Where it is detected that the frame is unrecorded, instructions are given to image forming sheet transfer means, and the image forming sheet 19 is moved a distance of one frame to the preheating position, where the frame is heated for activation. The frame of image forming sheet 19, thus rendered photosensitive by activation, is then brought to the cooling position, where the preheated frame is subjected to cooling. The frame of the image forming sheet 19, thus cooled after being activated, is further moved to the exposure position, where the image of a subject is projected to the frame. The thus exposed frame is then shifted a distance of one frame to the heat-developing position, where the latent image carried by the frame is developed by heating, thus completing recording on one frame.

Figure 8:
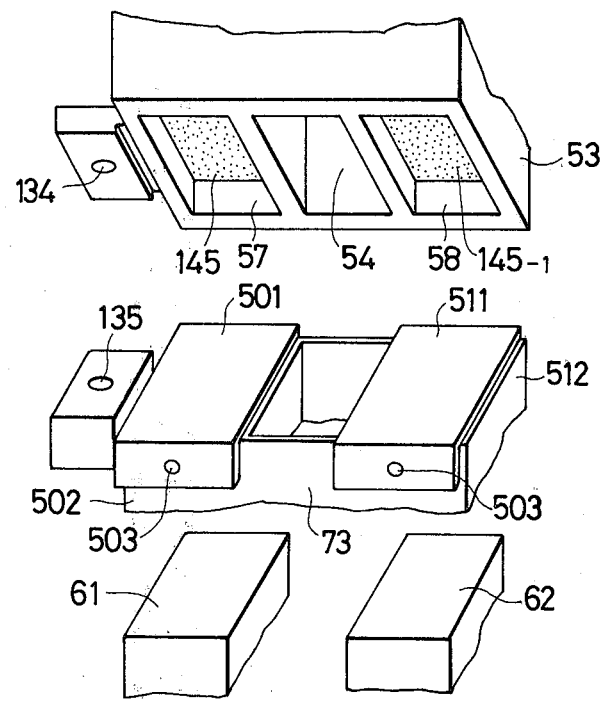
FIG. 8 is a perspective view of frame-shaped member of the body member of FIG. 7 as viewed from the side of an image forming sheet.

FIG. 8 shows, in perspective, the body tube member 53 and the side on which are provided the heaters 61 and 62, and the second frame 73 for exposure use. If the body tube member 53 is made of a material of relatively high thermal conductivity, such as brass, then heat of the heaters 61 and 62 is absorbed into the body tube member 53 of large thermal capacity through the image forming sheet 19 at the marginal portions of the heaters, ensuring to avoid the influence of heating on the adjoining frames.

Heating of the image forming sheet can be performed by a heating method of contacting a high-temperature gas with the sheet or exposing the sheet to irradiation by infrared or far infrared rays as well as the above-described method of contacting a high-temperature solid body directly with the image forming sheet. As the method of contacting the high-temperature gas with the image forming area support member or the image forming sheet, there can be mentioned a method of blowing the high-temperature gas against the image forming area support member or the image forming sheet. It is also possible to adopt the combined use of the method utilizing a solid body and the method utilizing gas or infrared rays or the like.

FIG. 13 shows, by way of example, an arrangement for blowing heated air or low-temperature air against the image forming sheet to heat or cool it. A heated air generator unit 351 is composed of generators 351a and 351b. In the generator 351a, air sucked therein through an air pipe 353 by an air pump 352 is normally sent through a dust collecting filter 354 into a heated air tank 355. In this case, the pump 352 is placed under control of an output part 357 of a switch 356 for detecting the pressure in the air tank 355, so that the pressure in the tank is maintained at a desired value. The air in the tank 355 is always blown by an air blower 358 into an air heating device 361 through an air pipe 359. A heating unit 364 in the heating device 361 is controlled by the output from an output part 363 of a temperature detecting element 362 placed in the tank 355, and air heated to a predetermined temperature is circulated from the heating device 361 through the air blower 358 back to the air tank 355. In this manner, the air in the tank 355 is controlled to remain at a predetermined temperature.

When the image forming sheet 19 is heated or cooled, it is held between the body tube 53 and the second frame-shaped member 146 in advance.

In the case of preheating the image forming sheet 19, electromagnetic three-way valves 365 and 366 are opened to permit intercommunication between air pipes 368 and 368a and between air pipes 372 and 372a respectively, and an air blower 367 is driven, so that the preheated air in the tank 355 is blown into the recess 57 from a jet 369a through the air blower 367, the air pipe 368a, the electromagnetic three-way valve 365, the air pipe 368 and the air inlet port 369, thus preheating the image forming sheet 19. Then, the air thus blown into the recess 57 is returned therefrom to the tank 355 through an air outlet port 371, the air pipe 372, the electromagnetic three-way valve 366, the air pipe 372a, the heating device 361 and the air blower 358.

By blowing such heated circulating air against the image forming sheet 19 from the jet 369a, the image forming sheet 19 is heat-activated to be rendered photosensitive. Next, when the image forming sheet 19 is cooled, the electromagnetic three-way valves 365 and 366 are opened to provide intercommunication between the air pipes 368 and 368b and between 372 and 372b, and the air blower 367 is driven. In this instance, air from the outside through an air pipe 368a passes through an air blower 367a, the air pipe 368b, the electromagnetic three-way valve 365, the air pipe 368 and the inlet port 369 and spouts into the recess 57 from the jet 369a, cooling the image forming sheet 19. The air thus blown into the recess 57 is exhausted to the outside through the outlet port 371, the air pipe 372, the electromagnetic three-way valve 366 and the air pipe 372b. In this manner, air sucked in from the outside is blown against the image forming sheet 19 from the jet 369a, by which the image forming sheet 19 is cooled after being preheated.

In the arrangement of FIG. 13, since the heated air is pressurized by the pump 352 and the air blower 367 to be supplied into the recess 57, the image forming area of the image forming sheet is heated and, at the same time, closely contacted with the flat plate 501. Also in the case of cooling, since the cooled air is pressurized by the air blower 367a to be supplied into the recess 57, the image forming area of the image forming sheet is cooled and, at the same time, closely contacted with the flat plate 501. Though not shown in FIG. 13, a device for controlling the pressure of the cooled air to a predetermined value may be provided, for example, in an intermediate portion of the air pipe 32b. Further, in the case of switching the supply of the heated air to the supply of the cooled air, if the electromagnetic three-way valves 365 and 366 are changed over while running the pump 352 and the air blowers 367 and 367a, then the heating operation is switched to the cooling operation, in the state in which the pressure in the recess 57 is held unchanged, that is, in the state in which the image forming area of the image forming sheet is held in close contact with the flat plate 501.

The generator 351b of the heated air generator unit 351 is identical in construction with the generator 351a described above. Heated air from the generator 351b passes through an air pipe 373 and an air inlet port 374 and spouts into the recess 58 to heat the image forming sheet 19, thereafter returning to the generator 351b through an air outlet port 375 and an air pipe 376. In the manner described just above, the heated, circulating air from the generator 351b is blown against the image forming sheet 19 from the jet 374a, resulting in the image forming sheet 19 being heat-developed. After the heat-developing process, the image forming sheet 19 may also be cooled by blowing thereagainst external air from the jet 374a in the same manner as in the case of cooling after activation by heating.

The temperature of the heated air produced by the generator 351a is usually controlled to remain a predetermined value within the range of 100° to 200° C. which is a little higher than the temperature to which the image forming sheet 19 is to be heated. Similarly, the temperature of the heated air produced by the generator 351b is usually retained at a predetermined value within the range from 100° to 220° C.

Figure 14:
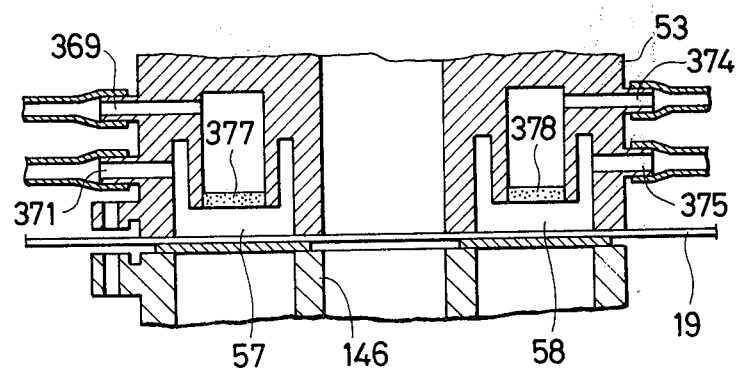
FIG. 14 is a cross-sectional view illustrating another example of the body tube member in the case of heating with heated air and cooling with low-temperature air.

As the air for cooling use, external air of room temperature is employed to cool the image forming sheet to a temperature below the glass transition point of the organic substrate of the image forming sheet, for example, between 60° C. to room temperature. It is also possible to control the cooling temperature at a predetermined value below 60° C., for example, in the range of 0° to 60° C. by using a cooling device. Also it is possible to adopt such an arrangement as shown in FIG. 14 in which the heated air and the air for cooling having passed through the inlet ports 369 and 374 are respectively blown out into the recesses 57 and 58 through distributing plates 377 and 378 made of a porous material. Further, the heated air and the cooling air may also be blown against the image forming sheet 19 on the opposite side from the body tube member 53. In such a case, frame shaped members are provided in opposing relation to the recesses 57 and 58 across the image forming sheet 19, and heated air and cooling air are respectively sent into the frame-shaped members and blown against the image forming sheet, if necessary, through distributing plates.

The above has illustrated the heating and the cooling means. As the first heating means for preheating use and the second heating means for heat-developing use, different types of heating means can be employed, but it is preferred in terms of design to employ heating means of the same kind; in general, it is preferred to heat the image forming sheet by a heating solid body through the image forming area support member.

The embodiment illustrated in FIGS. 1 to 3 is designed so that information recorded in the frame of the image forming sheet 19 placed at the exposure position is projected on an enlarged scale for reading. To this end, a light source box 161 is mounted on the base plate 22 below the second frame shaped member 73 for exposure use in FIG. 2, for instance. In the light source box 161 there is provided a light source 162 for reading, and, as required, a cooling fan 163 is disposed on the side of the base plate 22. Rays of light from the light source 162 are condensed by a concave mirror 164 and directed to a reflector 165 in parallel relation to the base plate 22 and then turned thereby to the side of the exposure position. The optical axis of the light thus turned at right angles is aligned with the axis of the second frame-shaped member 37 and the through hole 53. Above the reflector 165 is provided a condensing lens 166, and the light condensed by the lens 166 passes through the frame-shaped member 73 and irradiates that area of the image forming sheet 19 which underlies the through hole 54. The transmitted light from the image forming sheet 19 passes through the projecting lens 18 and is guided to the side of the reflector 125.

Figure 10:
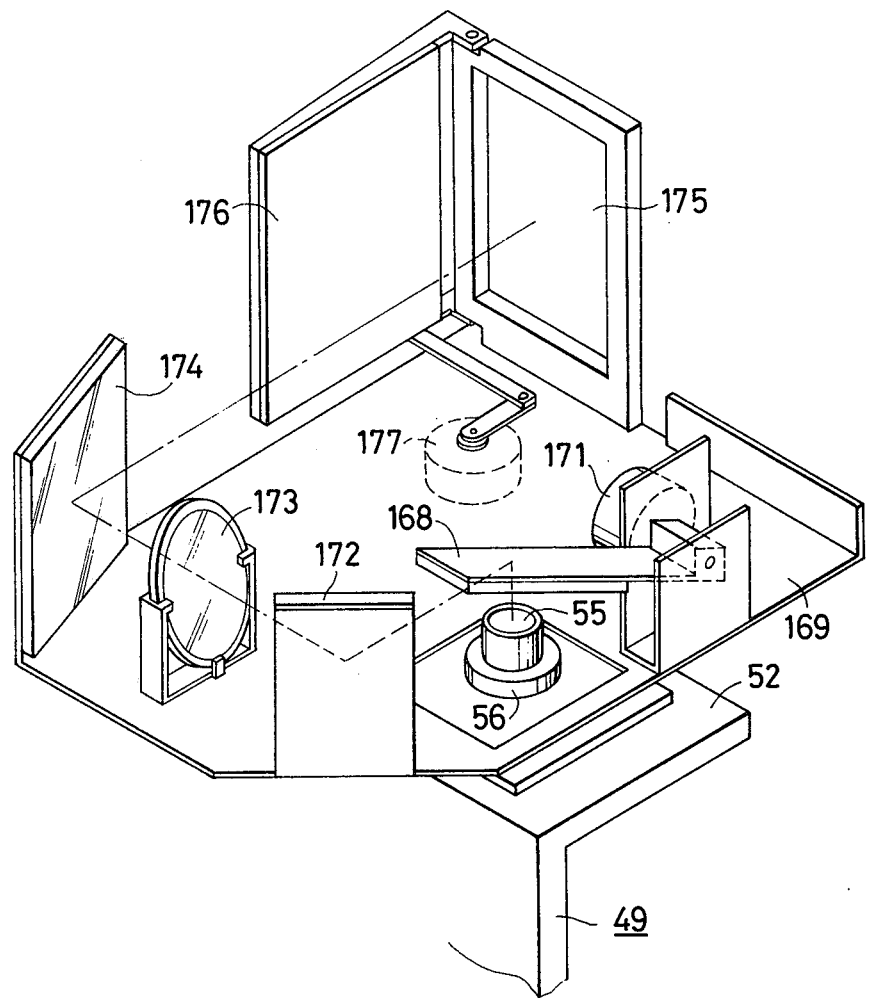
FIG. 10 is a perspective view showing means for forming an optical path for reading use.

Between the shutter 129 and the body tube member 53 is provided a rotary mirror 168 which can be moved into or out of the optical path of the image of a subject, as shown in FIG. 10. The rotary mirror 168 is pivotally mounted on a mounting plate 169 fixed to the front panel 15 of the housing 12. The rotary shaft of the rotary mirror 168 is driven by a solenoid 171. During recording the rotary mirror 168 is held away from the optical path between the reflector 125 and the body tube member 53, as indicated by the solid lines in FIG. 2. During reading the rotary mirror 168 is turned to be inserted in the abovesaid optical path at an angle with respect thereto, as indicated by the chain lines in FIG. 2. Accordingly, the light having passed through the body tube member 53 is reflected by the rotary mirror 168 and further reflected by a reflector 172 mounted on the mounting plate 169, passing substantially in parallel with the front panel 15, and enlarged by an enlarging projecting lens 173, thereafter being bent by a reflector 174 substantially at right angles to be projected on the screen 175 provided on the front panel 15 of the housing 12. During recording the screen 175 is covered with a cover plate 176 so that no unnecessary light enters from the screen 175. During reading the cover plate 176 is removed by the control of a solenoid 177, and a recorded image in the image forming area positioned right under the through hole 54 is projected onto the screen 175 on an enlarged scale.

There is a difference between the optical path from the subject holding part 13 to the image forming sheet 19 and the optical path from the image forming sheet 19 to the screen 175. In such a case as described above, the record on the image forming sheet 19 is clearly projected by the enlarging projecting screen 173 onto the screen 175 on an enlarged scale. The screen 175 need not always be provided on the front panel 15 but may also be disposed at any other convenient location. At any rate, by incorporating the enlarging projecting lens 173 in the optical path for enlarged projection use, information recorded in an arbitrarily selected one of frames on the image forming sheet 19 can be projected on an enlarged scale without transferring the image forming sheet 19 to a position different from that for photographing, or without mounting the image forming sheet 19 on a separate projector. Therefore, during recording information can be read immediately after being recorded. In order to ensure that during reading one frame of the image forming sheet 19 assumes a right position, the image forming sheet 19 is pressed by the second frame-shaped member 73 against the marginal portion of the through hole 54 of the body tube member 53.

As will be understood from the above, the addition of the enlarged projection means requires at least a light source, a condensing lens (or mirror) and a screen, and the other elements can be dispensed with as required.

A unit for controlling transfer, heating and exposure of the image forming sheet 19, application of a fluid pressure to the sheet 19 and so forth is disposed in a casing 205 placed in the housing 12 at the left-hand side, as viewed in FIG. 3. The abovesaid control is performed using the so-called microcomputer, for example. Temperature control for the heaters 61 and 62 is also achieved by the microcomputer. It is also possible to control, by the microcomputer, the temperature of the cooled gas supplied from the nozzles 82 and 83 or their operating time. The apparatus of the present invention is equipped with the control means such as an illustrated computer at least for commanding to bring the heating means into or out of contact with the flat portion of the image forming area support member and for commanding to control the aforesaid means for cooling the organic substrate of the image forming area in the state in which the image forming area is held in close contact with the flat portion of the image forming area after completion of heating.

Figure 15:
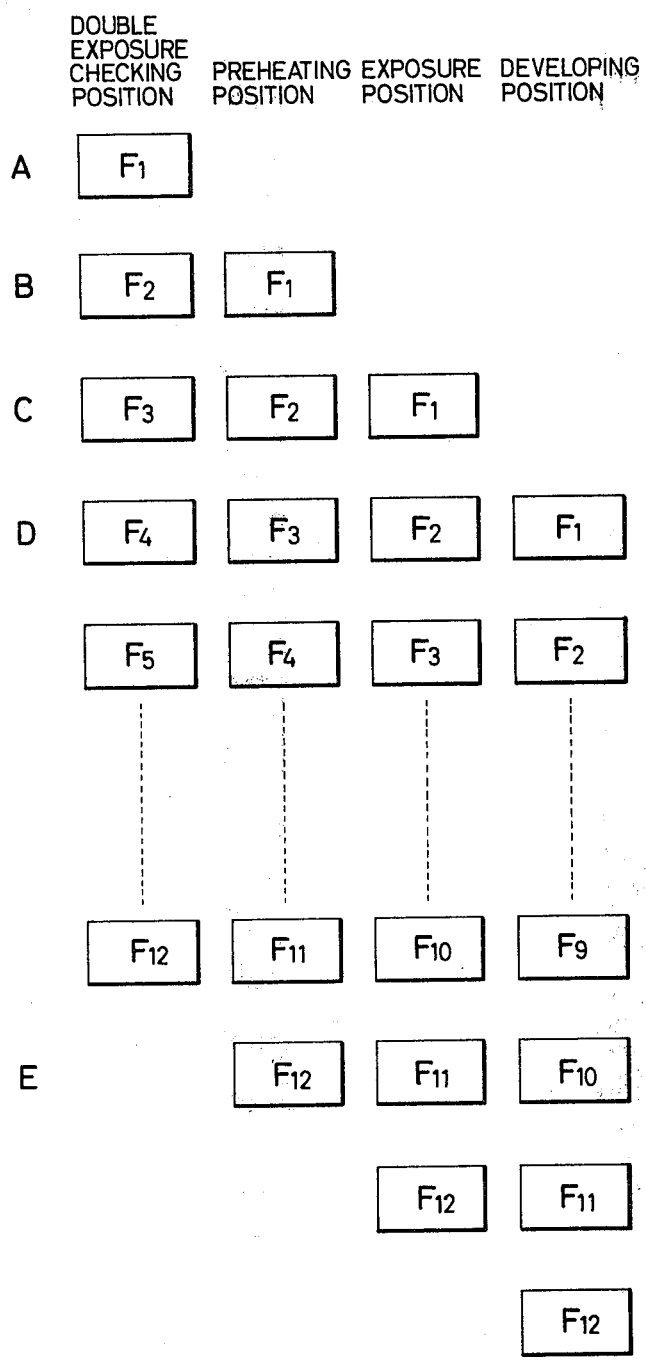
FIG. 15 is a diagram showing the relationships between frames of the image forming sheet and a double exposure checking, a preheating, an exposure and a heat-development position during successive recording.

In the case where the double image formation preventive means, the preheating means, the cooling means, the exposure means and the heat-development means are aligned at the same intervals as those of the image forming areas of the image forming sheet 19, it is possible not only to perform recording one image forming area of the sheet 19 by successively subjecting it to the respective processes but also to achieve higher-speed recording by simultaneously subjecting a plurality of image forming areas to any one of the respective steps. In the latter case, when a first designated frame $F_1$ is brought to a double exposure checking position, as shown in FIG. 15A, it is checked whether the frame $F_1$ is an already recorded one or not. If not, the image forming sheet is moved by one frame in the X-axis direction to bring the designated frame $F_1$ to the preheating position, as depicted in FIG. 15B. While the frame $F_1$ is preheated and cooled, the next frame $F_2$ is checked for double exposure at the same time. Where there is no fear of double exposure of the frame $F_2$, the image forming sheet is moved by one frame in the X-axis direction, bringing the frames $F_1$ and $F_2$ to the exposure position and the preheating position respectively, and the next frame $F_3$ to the double exposure checking position, as shown in FIG. 15C. The frames $F_1$ and $F_2$ are exposed and preheated respectively, and at the same time the frame $F_3$ is checked for double exposure. If it has turned out that the frame $F_3$ is not already recorded, the image forming sheet is further moved by one frame in the X-axis direction, bringing the frames $F_1$, $F_2$ and $F_3$ to the developing position, the exposure position and the preheating position respectively, and the next frame $F_4$ to the double exposure checking position, as shown in FIG. 15D. The frames $F_1$, $F_2$ and $F_3$ are simultaneously subjected to the development, the exposure and the preheating process respectively, and at the same time the frame $F_4$ is subjected to the double exposure checking process. Thereafter, each time the image forming sheet is similarly shifted by one frame in the X-axis direction, four frames are respectively checked for double exposure, preheated, exposed, and heat-developed substantially at the same time. In the case of completing such successive recording, when a last frame $F_{12}$ is brought to the preheating position, the preheating, the exposure, and the development process take place in parallel, but no double exposure checking process is performed, as shown in FIG. 15E. Then, the image forming sheet is moved by one frame in the X-axis direction, the exposure, and the development process take place in parallel; thereafter the image forming sheet is moved by one frame in the X-axis direction, the development process takes place only.

The conditions for recording in the foregoing embodiments are as follows: The preheating is conducted at a temperature in the range of 90° C. to 150° C. for a suitable time between 0.5 and 12 sec.; the exposure after rendering the image forming sheet photosensitive is performed under illumination of, for example, 2000 to 10,000 luxes for about 0.5 to 12 sec. or so; and the heat-development is effected at a temperature of, for example, 100° to 170° C. or so for a suitable time in the range of 0.5 to 12 sec.

Figure 16:
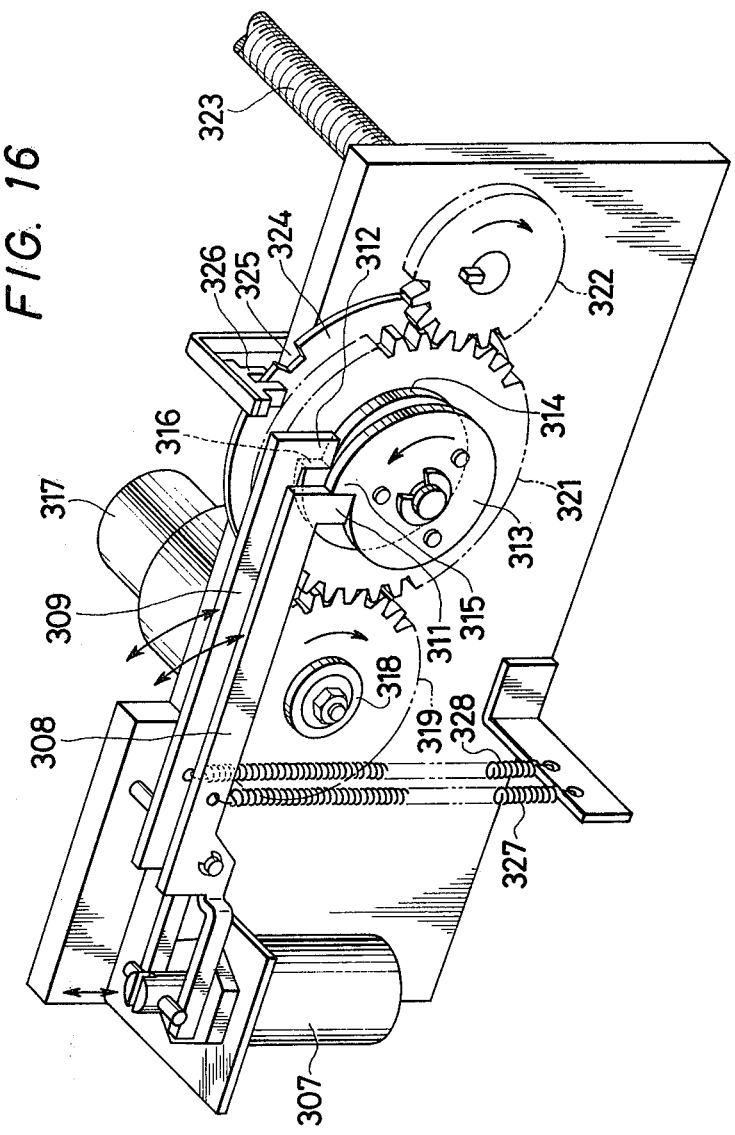
FIG. 16 is a perspective view illustrating an example of utilizing ratchet wheels for positioning of the image forming sheet.

In the above, a step motor is employed for driving, positioning and stopping of the image forming sheet transfer means, but other methods may also be employed. For example, as described hereunder, use can also be made of transfer means which is driven by an ordinary motor, positioned by a signal produced by a combination of an encoder and a photo sensor, and stopped by a latch. That is, as shown in FIG. 16, claws 311 and 312 of a forward revolving bar 308 and a backward revolving bar 309 are respectively disengaged from latches 315 and 316 of a forward revolving ratchet wheel 313 and a backward revolving ratchet wheel 314 by the action of a solenoid 307. Next, a motor 317 is driven to drive a rotary shaft 323 through a clutch 318 and gears 319, 321 and 322. An encoder 324, the gear 321 and the ratchet wheels 313 and 314 are fixed relative and formed as a unitary structure with one another and designed so that upon each rotation, the drive shaft 323 is driven corresponding to the distance of movement of the image forming sheet for one frame. When the gear 321 rotates by half, a notch 325 of the encoder 324 is detected by a photo sensor 326. This detection signal deenergizes the solenoid 307, and by the action of springs 327 and 328 the claws 311 and 312 slide on the outer peripheral surfaces of the ratchet wheels 313 and 314 respectively. With further rotation of the motor 317, the latch 315 of the ratchet wheel 313 strikes against the claw 311 of the bar 308, and at the same time the claw 312 of the bar 309 strikes against the latch 316 of the ratchet wheel 314, preventing reversal of the gear 321 due to repulsion of the shock. At the same time, the rotary drive shaft 323 is stopped from rotating. The motor 317 is timed to such an extent as to continue rotating for a while even after the gear 321 is stopped by the aforementioned detection signal from the photo sensor 326, and in this while overloading of the motor 317 is prevented by the clutch 318 until the motor 317 comes to rest after stopping of the gear 321. In this manner, the image forming sheet can be shifted and positioned with high accuracy, therefore, such a transfer mechanism as described above may also be employed.

Although the foregoing embodiments utilize the threaded shafts 33, 43 and 323 for shifting the image forming sheet, it is also possible to adopt a method using wires, a method using a rack and a pinion or a method using a chain. Of these methods, a method of moving the image forming sheet in two dimensions of the X and Y directions is effective when the image forming sheet is a microfiche.

In the apparatus shown in FIGS. 4 and 5, the heater 61 for preheating, the cooler 61a, the heater 61 for development and the second frame-shaped member 73 for exposure and brought into are out of contact with the image forming sheet, but it is also possible to fix them and move the body tube member 53 into and out of contact with the image forming sheet. Generally, it is desirable to adopt such an arrangement as shown in FIG. 2 in which the side of the body tube member 53 is fixed and the heaters and the second frame-shaped member for exposure are made movable so that the image forming position for the image of a subject can easily be fixed. Moreover, the illustrated mechanism for bringing the heaters and so on into and out of contact with the image forming sheet is suitable for use in practice, but this mechanism may also be replaced with others. Also, the exposure means may be substituted with other means than the aforementioned, but at least a projecting means for projecting the image of the subject onto the image forming sheet and a shutter are needed, and the other elements can be modified according to the position of the subject being placed; for example, the subject may also be placed on the top of the housing to face downwards. Further, the conditions for exposure can be changed as by presetting a predetermined exposure time without using an automatic exposure detector.

The above-described three-position processing system in which preheating, exposure and development take place at individual positions permits easy maintenance because of different functions being performed at different positions, and reduces the time of recording because recording is successively made over a plurality of image forming areas by parallel processing. But exposure and heating can also be achieved at the same position; this will hereinafter be referred to as the one-position system. This system is particularly suitable for use with the so-called one-frame recording system in which a series of preheating, exposing and developing operations are performed in succession for each frame, that is, information of a subject is recorded for each frame. Therefore, the one-position system is particularly suitable for an aperture type image forming sheet, but can also be employed for recording on only one frame of the microfiche type image forming sheet having a number of frames.

In this case, heaters of the same type may be used for preheating and for heat-development, but it is desirable in many cases that the heating temperatures of these two heaters differ from each other. Accordingly, it is preferred, for reduction of the time for recording on the image forming sheet, to employ separate heaters and a cooler and arrange the heater transfer means so that the individual heaters or the cooler are brought to the same specified position of the image forming sheet within a desired period of time. Further, in this one-position system, the frame-shaped member 73b provided with a flat plate 501 is employed in addition to the heaters and the cooler, and preheating including cooling, cooling, exposure and development are performed, with the image forming sheet fixedly held by the body tube member 53 and the abovesaid frame-shaped member 73b.

Figure 17:
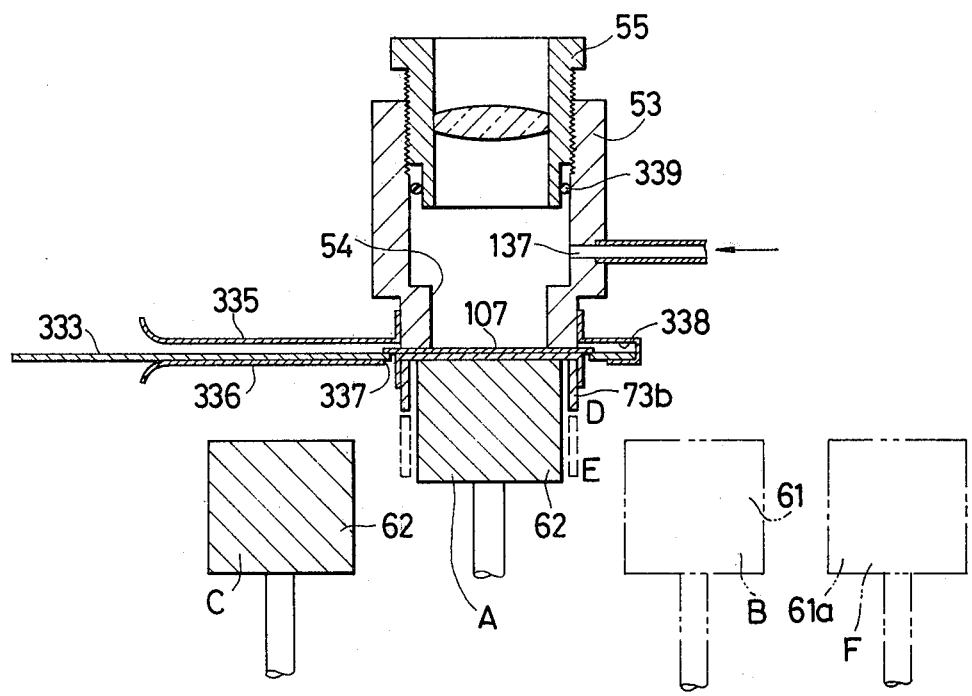
FIG. 17 is a cross-sectional view showing, by way of example, the body tube member and associated parts in one-position processing system.

FIG. 17 illustrates, in terms of conception, an example in which preheating, exposure and development are carried out in accordance with the one-position processing system. A pair of guides 335 and 336 are attached to the body tube member 53 so that one frame 107 of an aperture card 333 of an image forming sheet can be smoothly set at the exposure position, that is, at the position of the lower open end of the through hole 54. The lower guide 336 has formed therein at the exposure position an opening 337 a little larger than the frame-shaped 73b provided with a flat plate 501, and one end 338 of the guide 335 is formed to serve as a stopper so that the aperture card 333 is not inserted too much.

The surface of the image forming area 107 on the side of the body tube member 53 makes contact with the image forming position of the body tube member 53, and the body tube member 53 is threadably engaged with the body tube 55, and a pressurized gas inlet port 137 for introducing a pressurized gas from pressurized gas generating means (not shown) is formed in the side wall of the body tube member 53. An O-ring 339 for preventing leakage of the pressurized gas is interposed between the body tube member 53 and the body tube 55. The surface of the image forming area 107 on the opposite side from the body tube member 53 is pressed by the second frame-shaped member 73 for exposure use against the side of the body tube member 53 from the start of preheating until after completion of heat development, thus fixedly holding the image forming area 107 in position.

When holding the image forming area 107, the frame-shaped member 73b lies at its raised position D indicated by the solid line, but at the other times it assumes its lowered position E indicated by the broken line. This upward and downward movement of the frame-shaped member is performed by frame-shaped moving means (not shown).

The heater 61 for preheating is normally held at its stand-by position B, but when to carry out the preheating process it is brought by preheater moving means (not shown) to an exposure position A surrounded by the frame-shaped member 73b and preheats the image forming area 107, thereafter being returned to the position B. The cooler 61a normally stays at its stand-by position F, but in the case of cooling it is brought by cooler moving means (not shown) to the exposure position A for cooling the image forming area 107, thereafter being returned to the position F. The heater 62 for heat development is normally held at its stand-by position C and brought by heat-development heater moving means (not shown) to the exposure position A to heat-develop the image forming area 107, thereafter being brought back to the position C.

In the case of manually bringing the image forming area 107 of the aperture card 333 to the exposure position, no image forming sheet transfer means is needed. The portion of the aperture card 333 except the image forming area 107 may also be used as a holder. Also, it is possible to provide only one heater and increase the time of contact of the heater with the image forming area through the image forming area support member or change the degree of heating it through the image forming area support member in dependence on whether the heater is used for preheating of heat development.

The preheating or heat-development process may also be performed at a position different from that of exposure. Also, it is possible to adopt such a two-position processing system that the preheating, the cooling and the heat-development process take place at the same position different from the exposure position. Further, it is also possible to apply such a one-position processing system as shown in FIG. 17 to each image forming area 107 of the image forming sheet 19 in place of the aperture card 333. The cooling of the image forming sheet after preheating has been described in the foregoing, but for preventing damage and thermal deformation of the image forming sheet, it is preferred that also after being heat-developed, the image forming sheet is cooled by the same cooling means used after the preheating process.

With the present invention described in the foregoing, it is possible to prevent heat deformation of the image forming area after the heating process, thus ensuring to obtain an image of good quality, as will be described in connection with examples of the invention.

With the heat-developable image forming apparatus of this invention, an image can be recorded and developed on the image forming sheet frame by frame without the necessity of providing a dark room for handling a raw image forming sheet, and the developed image forming sheet can be preserved for subsequent reproduction of the record and, if necessary, can be loaded again on the image forming apparatus for new recording on an unrecorded frame of the sheet.

Since no dark room is required and since development is not wet-type, no developer is used; consequently, the image forming apparatus is very simple in structure, and the image forming sheet can be preserved after being subjected to recording in one or some frames only and, if necessary, can be subjected to additional recording in other frames. Moreover, with the image forming apparatus provided with means for cooling the image forming sheet after preheated, which is one of the features of this invention, it is possible to cause a substantial increase in the sensitivity of the image forming sheet by cooling it after the heat-activation process, producing an image of high resolving power.

The image forming method of this invention will be described in more detail in connection with its examples.

EXAMPLE 1

The image forming sheet was prepared by the following method. Four parts by weight of silver behenate and 20 parts by weight of a mixed solution of methyl ethyl ketone and toluene (in the ratio of 2 to 1 by weight) were ball-milled for 24 hours to prepare a silver behenate suspension. The following compositions were prepared using the silver behenate suspension and coated a polyester film to a thickness of 100 μm, and the coating was at room temperature.

| First layer | |
| --- | --- |
| Silver behenate suspension | 12 g |
| Polyvinylbutyral | 3 g |
| Methyl ethyl ketone | 12 g |
| Tetrabromobutane | 0.30 g |
| Mercury acetate | 0.05 g |
| Triphenylphosphine | 0.03 g |
| Bromine | 0.12 g |
| Cobalt bromide | 0.03 g |
| Quinoline | 0.25 g |
| Second layer | |
| Cellulose acetate | 1.2 g |
| Acetone | 16.3 g |

| -continued | |
|---|---|
| Phthalazinone | 0.28 g |
| 2,2'-methylenebis (6-tert-butyl-4-ethylphenol) | 0.70 g |

After coating of the first layer, the second layer was coated thereon 60 μm thick, and the coating was dried at room temperature. Images were formed on the thus obtained image forming sheet by photographing a step tablet and a resolving power chart, using the apparatus of the present invention. The photographing was conducted under the following conditions, using the apparatus of FIGS. 1 to 4 which was provided with the heating unit shown in FIG. 7 or 8.

Temperature of first heater 61: 110° C.
Temperature of second heater 62: 130° C.
Thin plates 501 and 502 were made of a 100 μm thick stainless steel plate (SUS 304).
Illumination of document: 6000 lux The recording process is as follows:

The image forming sheet 19 was urged against the upper frame 59 by the thin plate 501 and, at the same time, the heater 61 was pressed against the plate 501 under a pressure of about 500 gr. In this while, air was flowed into the recess 57 through the pipe 138 to provide a pressure of about 1000 mmH$_2$O, by which the side of a polyester substrate of the image forming sheet was closely contacted with the thin plate 501. After the image forming sheet was thus held in close contact with the thin plate 501 for three seconds, only the heater 61 was moved down. After three second, the polyester substrate of the image forming sheet was cooled down to 60° C. below the glass transition point of the polyester substrate and then the thin plate 501 was lowered. Next, the image forming sheet was shifted to right by one frame to bring the heat-activated area to the position of the through hole 54 and the second frame-shaped member 73 is moved up to press the image forming sheet against the upper frame 59. After the image forming sheet was exposed to light images of the step tablet and the resolution chart for three seconds and the second frame-shaped member 73 is brought down and the image forming sheet 19 was shifted to right by one frame and then subjected to the heat development process. The heat development process was similar to the heat activation process. That is, the image forming sheet 19 was pressed against the upper frame 59 by the thin plate 511 and, at the same time, the heater 62 was pressed against the thin plate 511 under a pressure of about 500 gr. In this while, pressurized air was flowed into the recess 58 through the pipe 139 to provide a pressure of approximately 1000 mmH$_2$O in the recess 58, closely contacting the image forming sheet with the thin plate 511. After heating the image forming sheet for three seconds, only the heater 62 was lowered. The image forming sheet was held in close contact with the thin plate 511 for three seconds to lower the temperature of the polyester substrate to a temperature below its glass transition point and then the thin plate 502 was brought down.

Figure 18:
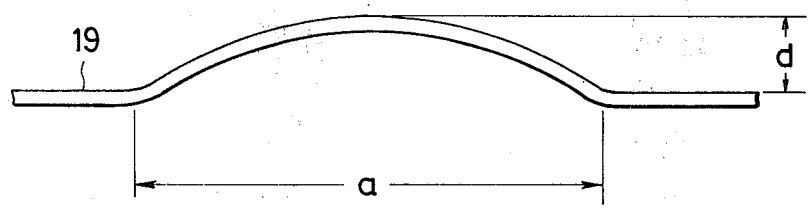
FIG. 18 is an enlarged sectional view showing measured heat deformation of the image forming sheet.

Table 1 shows the measured results of the images thus recorded on the image forming sheet. The resolving power of the images on the image forming sheet was measured by means of a microscope and is shown as resolving power (master) in Table 1. The optical density (OD) of the portion of highest optical density among the images of the step tablet was measured by a densitometer Model TD-500 by Macbeth Inc. The amount of heat deformation of this image forming portion was measured by a micro depth-height measuring instrument Model KY-90. The amount of heat deformation mentioned herein is a value obtained by measuring a height d in FIG. 18. In FIG. 18, reference numeral 19 indicates the section of the image forming material, and the area indicated by a is one frame treated for forming thereon an image. Further, the resolving power of images duplicated on a diazo-film by a duplicator 261 Type of 3M Inc. from the image forming sheet was measured by a microscope. In Table 1, this is shown as resolving power (duplicated).

EXAMPLE 2

In the apparatus shown in FIG. 7 or 8, the thin plate 511 was disassembled from the frame-like member 512, and images were formed on the image forming sheet under the same conditions as in Example 1 except the following point. Namely, in this example, in the last development process the thin plate 511 was not used and after the image forming sheet was closely contacted directly with the heater 62 and heated for three seconds, the heater 62 was brought down from the sheet and, at the same time, the frame-like member 512 was also lowered, putting an end to the heat development. The resolving power of the image forming sheet thus photographed was measured as in Example 1. The measured results are shown in Table 1.

EXAMPLE 3

In the apparatus of FIG. 7 or 8, the thin plate 510 was disassembled from the frame-like member 502, and images were formed on the image forming sheet under the same conditions as in Example 1 except the following point. Namely, in the activation process the thin plate 501 was not used and after the image forming sheet was closely contacted directly with the heater 61 and heated for three seconds, the heater 61 was brought down from the sheet and, at the same time, the frame-like member 502 was also lowered and the image forming sheet was held in this state for three seconds for cooling and then the next exposure process was started. The resolving power and so on of the image forming sheet thus photographed were measured in the same manner as in Example 1. The measured results are shown in Table 1.

COMPARISON EXAMPLE 1

In the apparatus of FIG. 7 or 8, the thin plate 501 and 511 were disassembled from the frame-like members 502 and 512, and images were formed on the image forming sheet under conditions similar to those used in Example 1. The image forming conditions in this example differed from those in Example 1 in the following points. In the activation process the thin plate 501 was not used and after the image forming sheet was closely contacted directly with the heater 61 and heated for three seconds, the heater 61 was brought down from the sheet and, at the same time, the frame-like member 502 was also lowered and the image forming sheet was held in this state for three seconds for cooling and then subjected to the next exposure process. Further, in the last development process the thin plate 511 was not used and after the image forming sheet was closely contacted directly with the heater 62 and heated for three seconds, the heater 62 was brought down to get out of contact with the sheet and, at the same time, the frame-like member 512 was also lowered, putting an end to the heat development process. The resolving power and so on of the image forming sheet thus photographed were measured as in Example 1. The measured results are shown in Table 1.

EXAMPLE 4

Images were formed on the image forming sheet under conditions similar to those used in Example 1 except in the following points. Namely, in the activation process the heater 61 was held in contact with the thin plate 501 to heat the image forming sheet for three seconds and then the heater 61 was brought down. At the same time, pressurized air was blown against the thin plate 501 from the nozzles 81 and 82, with the image forming sheet held in close contact with the thin plate 501, by which the thin plate 501 was air-cooled for three seconds to lower the temperature of the polyester substrate down to 60° C. below its glass transition point, and thereafter the exposure process was initiated. The resolving power and so on of the image forming sheet thus photographed were measured in the same manner as in Example 1. The measured results are shown in Table 1.

EXAMPLE 5

Images were formed on the image forming sheet under conditions similar to those in Example 1 except in that nozzles similar to the nozzles 81 and 82 for cooling use were provided below the second frame-shaped member 73 in the apparatus of FIG. 7 and in that pressurized air was blown against the image forming sheet from the abovesaid nozzles during exposure. The resolving power and so on of the image forming sheet thus photographed were measured in the same manner as in Example 1. The measured results are shown in Table 1.

EXAMPLE 6

Images were formed on the image forming sheet under the same conditions as in Example 1 except in that the second frame-shaped member 73 having no square hole in the apparatus of FIG. 7 was pressed against the image forming sheet to cool it during the exposure process. The resolving power and so on of the image forming sheet thus photographed were measured in the same manner as in Example 1. The measured results are shown in Table 1.

EXAMPLE 7

Images were formed on the image forming sheet through the use of the apparatus illustrated in FIG. 9. In FIG. 9, heat treatment members 601 and 611 respectively have formed therein spaces 602 and 612 in such a manner that a heated or cooled fluid may be supplied thereinto from inlet pipes 603 and 613 and discharged from outlet pipes 604 and 614, respectively. The switching between the heated fluid supply and the cooled fluid supply can be done by the same mechanism as shown in FIG. 13. With the use of this apparatus, it is possible to perform the heating and the cooling process, with a heater 601 or 611 urged against the image forming sheet. Images were formed on the image forming sheet under conditions similar to those used in Example 1. The image forming sheet was held between the upper frame 59 and the heat treatment member 601, and silicon oil heated up to 110° C. was flowed into the heat treatment member from the inlet pipe 603. After three seconds, the electromagnetic valve was changed over to flow silicon oil of 40° C. into the heat treatment member 601 for two seconds to cool the temperature of the polyester substrate down to 60° C. below its glass transition point. Thereafter, the heat treatment member 601 was lowered. The image forming area of the image forming sheet was thus activated by the heater 61. Next, the image forming sheet was moved to right by one frame to bring the heat-activated area to the position right under the through hole 54 and the second frame-shaped member 73a was brought up to press the image forming sheet 19 against the upper frame 59. After the image forming sheet was exposed to light images of the step tablet and the resolving power chart for three seconds, the second frame-shaped member 73a was brought down and the image forming sheet was shifted to right by one frame and subjected to the heat development process. The heat development process was the same as the abovesaid activation process except in that the temperature of the heated fluid was 130° C. The resolving power and so on of the image forming sheet thus photographed were measured in the same way as in Example 1. The measured results are shown in Table 1.

COMPARISON EXAMPLE 2

Image were formed on the image forming sheet under the same conditions as in Example 1 except in that after the image forming sheet was heat-activated for three seconds, both of the heater 61 and the thin plate 501 were immediately moved down and the image forming sheet was moved to bring the activated area to the position right below the through hole 54, and in that after the image forming sheet was heated for development for three seconds, both of the heater 62 and the thin plate 511 were brought down. The resolving power and so on of the image forming sheet thus photographed were measured in the same manner as in Example 1. The measured results are shown in Table 2.

EXAMPLE 8

Images were formed on image forming sheets under the same conditions as those adopted in Example 1 except in that stainless steel plates (SUS 304) respectively having thickness of (a) 50 μm, (b) 200 μm, (c) 300 μm and (d) 500 μm were used as the thin plates 501 and 511. The resolving power and so on of the image forming sheets were measured in the same manner as in Example 1. The measured results are given in Table 2.

EXAMPLE 9

In Example 1, the time during which only the heater 61 was held in its lowered position after heating the image forming sheet by the heater 61 closely contacted with the thin plate 501 for three seconds in the activation process was three seconds. In Example 9, images were formed on image forming sheets under the same conditions as those in Example 1 except in that the abovesaid time was changed to (a) 0.5 sec, (b) 1.0 sec, (c) 5 sec and (d) 10 sec. The resolving power and so on of the image forming sheets were measured in the same manner as in Example 1. The measured results are shown in Table 2.

EXAMPLE 10

Image forming sheets prepared by the following methods (a), (b), (c) and (d) were tested under the same conditions as those employed in Examples 1 to 9, and the measured results were substantially the same as shown in Tables 1 and 2.

(a) The image forming sheet was prepared by the following method corresponding to the method set forth in the aforementioned U.S. Pat. No. 3,802,888.

Eighty-five parts by weight of a 1:1 mixed solvent of toluene and methyl ethyl ketone and 15 weight parts of silver behenate were homogeneously mixed to prepare a paste of silver behenate. Then, 35 g of a 9% polyvinyl butyral-methyl ethyl ketone was added to 15 g of paste with stirring to obtain a silver behenate dispersed polyvinyl butyral solution. To this solution were added 0.25 g of phthalazinone, 0.12 g of $HgBr_2$ and 0.89 g of bis-(2-hydroxy-3,5-di-tert-butylphenyl)methane, and the mixture was stirred. The mixture was coated 80 μm thick on a polyester sheet, and the coating was dried at room temperature. Next, a 5% cellulose acetate-acetone solution was coated on the dried coating to a thickness of 50 μm and dried at room temperature to form a protective layer.

(b) The image forming sheet was prepared by the following method corresponding to the method disclosed in U.S. Pat. No. 3,764,329.

Fifteen parts by weight of silver behenate and 85 parts by weight of methyl ethyl ketone were homogeneously mixed to obtain a silver behenate suspension. To 67 g of silver behenate suspension were added 60 g of methyl ethyl ketone, 10 g of polyvinyl butyral, 0.35 g of mercuric acetate, 0.49 g of N-bromosuccinimide and 20 g of 1-methylpyrrolydine, and they were sufficiently mixed and dissolved. The mixture was coated on a polyester sheet to a thickness of 100 μm and air-dried at room temperature. Next, a solution consisting of 12 parts by weight of cellulose acetate, 163 parts by weight of acetone, 2.8 parts by weight of phthalazinone and 7 parts by weight of 2,4,4-trimethyl-pentyl-bis(2-hydroxy-3,5-dimethylphenyl)methane was coated on the first layer to a thickness of 60 μm, and the coating was dried.

(c) The image forming sheet was prepared by the following method corresponding to the method set forth in U.S. Pat. No. 4,113,496.

Twelve parts by weight of silver behenate and 88 parts by weight of a 2:1 mixed solvent of methyl ethyl ketone were homogeneously mixed to obtain a silver behenate suspension. Six g of the silver behenate suspension was sufficiently mixed with 4 g of methyl ethyl ketone, 0.72 g of polyvinylbutyral, 0.02 g of mercuric acetate, 0.096 g of tetrabromobuthane, 0.03 g of bis-(P-methoxyphenyl)-tellurium-dibromide and 1.2 ml of sensitizing coloring matter solution. The mixture was coated on a polyester sheet to a thickness of 100 μm, and the coating was dried at room temperature. The sensitizing coloring matter solution is a solution containing 0.4 g of 3-carboxyethyl-5-[(3-ethyl-2-benzothiazolidiene)-2-butenylidene]-rhodanine. Then, a solution consisting of 8.3 g of acetone, 0.62 g of cellulose acetate, 0.14 g of phthazinone and 0.35 g of 2,2'-methylene-bis-(4-ethyl-6-tert-butyl)phenol was coated on the abovesaid coating to a thickness of 60 μm and dried at room temperature.

TABLE 1

|  | Heat deformation μm | Resolving power (/mm) Master | Resolving power (/mm) Duplicate | O.D. |
|---|---|---|---|---|
| Example 1 | 15 | 140 | 130 | 1.1 |
| Example 2 | 50 | 140 | 100 | 1.1 |
| Example 3 Comparison | 30 | 105 | 85 | 1.0 |
| Comparison Example 1 | 90 | 100 | 70 | 1.1 |

TABLE 1-continued

|  | Heat deformation μm | Resolving power (/mm) Master | Resolving power (/mm) Duplicate | O.D. |
|---|---|---|---|---|
| Example 4 | 13 | 145 | 135 | 1.3 |
| Example 5 | 16 | 140 | 130 | 1.3 |
| Example 6 | 16 | 140 | 130 | 1.3 |
| Example 7 | 12 | 140 | 130 | 1.3 |

TABLE 2

|  | Heat deformation μm | Resolving power (/mm) Master | Resolving power (/mm) Duplicate | O.D. |
|---|---|---|---|---|
| Comparison Example 2 | 100 | 70 | 50 | 0.5 |
| Example 8(a) | 25 | 110 | 90 | 1.1 |
| Example 8(b) | 12 | 135 | 125 | 1.1 |
| Example 8(c) | 10 | 120 | 110 | 1.0 |
| Example 8(d) | 10 | 110 | 95 | 0.9 |
| Example 9(a) | 40 | 120 | 105 | 0.8 |
| Example 9(b) | 30 | 125 | 110 | 1.0 |
| Example 9(c) | 12 | 145 | 130 | 1.2 |
| Example 9(d) | 10 | 150 | 130 | 1.3 |

(d) The image forming sheet was prepared by the following method corresponding to that disclosed in U.S. Pat. No. 3,816,132 and Japanese Patent Disclosure Gazette No. 127,719/76.

Seventeen g of silver behenate, 13 g of behenic acid, 40 g of polyvinyl butyral, 350 ml of toluene and 350 ml of ethanol were sufficiently mixed homogeneously. The mixture was coated on a polyester sheet to a thickness of 100 μm and dried at room temperature. Then, a mixture consisting of 51 g of 2,2'-methylenebis-(4-methyl-6-tert-butylphenol), 15 g of phthalazinone, 0.16 g of mercuric acetate, 0.01 g of

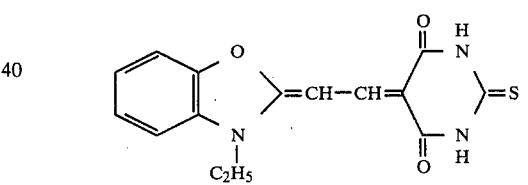

Ten g of polyvinyl butyral and 1 l of ethanol was coated on the abovesaid coating to a thickness of 60 μm and dried at room temperature.

It will be apparent that many modifications and variations may be effected without departing from the scope of the novel concepts of this invention.

What is claimed is:

1. An image forming method for forming an image, using an image forming sheet which has on an organic substrate a heat-developable image forming layer that is normally non-photosensitive but is rendered photosensitive by preheating prior to exposure and forms therein a latent image by exposure and then provides a visible image by heat development, characterized in that, in order to prevent an image forming area of the image forming sheet from heat deformation by heating for the preheating or heat development, the image forming area is heated by heating means, holding the opposite side from the image forming layer corresponding to the image forming area in close contact with a flat portion of an image forming area support member in a manner to extend over the entire area of the flat portion; after the heating, the image forming area is cooled down to a temperature below the glass transition point of the organic substrate, still holding the opposite side from the image forming layer corresponding to the image forming area in close contact with the flat portion of the image forming area support member; and after the cooling, the image forming area support member is brought out of contact with the image forming area.

2. An image forming method according to claim 1, wherein the image forming sheet is made of a material containing at least an organic silver salt oxidizing agent, a silver ion reducing agent and a binder.

3. An image forming method according to claim 2, wherein the material further contains at least one of a silver halide and a source of halogen ions capable of forming the silver halide by reaction with an organic silver salt to form the silver halide, and a mercuric ion source.

4. An image forming method according to claim 2, wherein the material further contains at least one of organic carboxylic acid and a sensitizing dye, and a mercuric ion source.

5. An image forming method according to claim 1, wherein the image forming area support member is a metal plate.

6. An image forming method according to claim 5, wherein the heating is performed by contacting a high-temperature metal block with the metal plate.

7. An image forming method according to claim 5, wherein the heating is performed by blowing a high-temperature gas against the metal plate or the image forming sheet.

8. An image forming method according to claim 5, wherein the cooling is performed by contacting with the metal plate a metal block of a temperature below the glass transition point of the organic substrate.

9. An image forming method according to claim 5, wherein the cooling is performed by blowing against the metal plate or the image forming sheet a gas of a temperature below the glass transition point of the organic substrate.

10. An image forming method according to claim 1, wherein the image forming support member is a metal block; and the image forming area is heated by introducing a high-temperature heat medium into the metal block and then cooled by introducing thereinto a heat medium of a temperature below the glass transition point of the organic substrate.

11. An image forming method according to claim 1, wherein a pressure is applied by a pressurized fluid to the side of the image forming layer of the image forming sheet to hold it in close contact with the flat portion of the image forming area support member.

12. An image forming method according to claim 11, wherein a frame-shaped member is disposed on the side of the image forming layer of the image forming sheet; and a pressurized fluid is introduced into the frame-shaped member to hold the image forming sheet in close contact with the flat portion of the image forming area support member.

13. An image forming method according to claim 11, wherein the pressurized fluid is pressurized air.

14. An image forming method according to claim 1, wherein the image forming area is preheated up to 90° to 150° C. and heated for development up to 100° to 170° C.

15. An image forming method according to claim 1, wherein after being preheated and cooled, the image forming area is cooled before and/or during exposure.

16. An image forming method according to claim 15, wherein the cooling temperature before and/or during exposure is below 60° C.

17. An image forming method according to claim 16, wherein the cooling temperature before and/or during exposure is below 40° C.

18. Image forming apparatus for forming an image, using an image forming sheet which has on an organic substrate a heat-developable image forming layer that is normally non-photosensitive but is rendered photosensitive by preheating prior to exposure and forms therein a latent image by exposure and then provides a visible image by heat development, characterized by one or two heating means for preheating and heat-developing an image forming area of the image forming sheet; an image forming area support member disposed on the opposite side from the image forming layer of the image forming sheet at the operating position of at least one of the heating means; means for holding the image forming area in close contact with a flat portion of the image forming area support member in a manner to extend over the entire area of the flat portion; means for bringing into or out of contact with the image forming area support member the heating means for heating the image forming area through the flat portion of the image forming area support member; means for cooling the image forming area through the flat portion of the image forming area support member; and controlling means for bringing the image forming area support member into or out of contact with the image forming area for cooling it, with the image forming area held in close contact with the flat portion of the image forming area support member after heating.

19. Image forming apparatus according to claim 18, wherein the image forming area support member is a metal plate.

20. Image forming apparatus according to claim 19, wherein the heating means is to contact a high-temperature metal block with the metal plate.

21. Image forming apparatus according to claim 19, wherein the heating means is to blow a high-temperature gas against the metal plate or the image forming sheet.

22. Image forming apparatus according to claim 19, wherein the cooling means is to contact with the metal plate a metal block of a temperature below the glass transition point of the organic substrate.

23. Image forming apparatus according to claim 19, wherein the cooling means is to blow against the metal plate or the image forming sheet a gas of a temperature below the glass transition point of the organic substrate.

24. Image forming apparatus according to claim 19, wherein the heating means is to introduce a pressurized high-temperature gas on the side of the image forming layer of the image forming sheet for simultaneously heating and holding it in close contact with the image forming area support member, and wherein the cooling means is to introduce a pressurized gas of a temperature below the glass transition point of the organic solvent on the side of the image forming layer of the image forming sheet for simultaneously cooling and holding it in close contact with the image forming area support member.

25. Image forming apparatus according to claim 18, wherein the image forming area support member is a metal block.

26. Image forming apparatus according to claim 25, wherein the metal block is provided with means for introducing thereinto a high-temperature heat medium to heat the image forming area and then introducing thereinto a heat medium of a temperature below the glass transition point of the organic substrate to cool the image forming area.

27. Image forming apparatus according to claim 18, wherein the means for holding the image forming area with the image forming area support member is to apply a pressure to the side of the image forming layer of the image forming sheet by a pressurized fluid to hold it in close contact with the flat portion of the image forming area support member in a manner to extend over the entire area of the flat portion.

28. Image forming apparatus according to claim 27, wherein the holding means includes a frame-shaped member disposed on the side of the image forming layer of the image forming sheet and is to introduce a pressurized fluid into the frame-shaped member to hold the image forming sheet in close contact with the flat portion of the image forming area support member in a manner to extend over the entire area of the flat portion.

29. Image forming apparatus according to claim 27, wherein the pressurized fluid is pressurized air.

30. Image forming apparatus according to claim 18, further comprising cooling means for cooling the preheated image forming area of the image forming sheet before and/or during exposure after the preheating and the subsequent cooling of the image forming area.

* * * * *